(12) United States Patent
Hwang et al.

(10) Patent No.: US 10,349,382 B2
(45) Date of Patent: *Jul. 9, 2019

(54) APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

(71) Applicant: LG ELECTRONICS INC., Seoul (KR)

(72) Inventors: Jaeho Hwang, Seoul (KR); Byounggill Kim, Seoul (KR); Woochan Kim, Seoul (KR); Jaehyung Kim, Seoul (KR); Sungryong Hong, Seoul (KR); Chulkyu Mun, Seoul (KR); Jinyong Choi, Seoul (KR); Jongseob Baek, Seoul (KR); Kookyeon Kwak, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/434,858

(22) Filed: Feb. 16, 2017

(65) Prior Publication Data

US 2017/0164328 A1 Jun. 8, 2017

Related U.S. Application Data

(63) Continuation of application No. 14/278,431, filed on May 15, 2014, now Pat. No. 9,609,628.

(Continued)

(51) Int. Cl.
*H04W 72/00* (2009.01)
*H04W 28/06* (2009.01)
(Continued)

(52) U.S. Cl.
CPC .......... *H04W 72/005* (2013.01); *H04H 20/72* (2013.01); *H04L 1/0033* (2013.01);
(Continued)

(58) Field of Classification Search
CPC ....... H04W 72/005; H04W 4/06; H04W 8/26; H04L 12/189; H04L 12/185
See application file for complete search history.

(56) References Cited

U.S. PATENT DOCUMENTS 6,169,843 B1 1/2001 Lenihan
6,883,012 B1 4/2005 Ryan
(Continued)

FOREIGN PATENT DOCUMENTS

CN 101926172 A 12/2010
EP 2362650 A1 8/2011
(Continued)

OTHER PUBLICATIONS

European Search Report dated Feb. 7, 2017 for European Patent Application No. 14797689.8, 8 pages.

*Primary Examiner* — Gbemileke J Onamuti
*Assistant Examiner* — Sanjay K Dewan
(74) *Attorney, Agent, or Firm* — Dentons US LLP

(57) ABSTRACT

A method and an apparatus for transmitting broadcast signals thereof are disclosed. The apparatus for transmitting broadcast signals comprises an input formatter to format at least one input stream to output DP (Data Pipe) data corresponding to each of a plurality of DPs, wherein the each of a plurality of DPs carries at least one service or at least one service component, an encoder to encode the DP data, a mapper to map the encoded DP data onto constellations, a time interleaver to time interleave the mapped DP data, a frame builder to build at least one signal frame including the time interleaved DP data, a modulator to modulate data in (Continued)

the built at least one signal frame by an OFDM (Orthogonal Frequency Division Multiplex) scheme and a transmitter to transmit the broadcast signals having the modulated data.

8 Claims, 34 Drawing Sheets

Related U.S. Application Data

(60) Provisional application No. 61/823,886, filed on May 15, 2013, provisional application No. 61/823,891, filed on May 15, 2013, provisional application No. 61/883,959, filed on Sep. 27, 2013.

(51) Int. Cl.
*H04L 1/00* (2006.01)
*H04L 5/00* (2006.01)
*H04L 27/26* (2006.01)
*H04L 29/06* (2006.01)
*H04H 20/72* (2008.01)
*H04L 1/06* (2006.01)

(52) U.S. Cl.
CPC .......... *H04L 1/0036* (2013.01); *H04L 1/0057* (2013.01); *H04L 1/0065* (2013.01); *H04L 1/0068* (2013.01); *H04L 1/0071* (2013.01); *H04L 1/06* (2013.01); *H04L 5/0007* (2013.01); *H04L 27/2601* (2013.01); *H04L 69/04* (2013.01); *H04W 28/06* (2013.01)

(56) References Cited

U.S. PATENT DOCUMENTS

| | | | |
|---|---|---|---|
| 2004/0073929 A1* | 4/2004 | Morello | H04L 1/0003 725/63 |
| 2006/0274737 A1 | 12/2006 | Liu et al. | |
| 2007/0064588 A1 | 3/2007 | Kisoda et al. | |
| 2011/0286535 A1* | 11/2011 | Ko | H04L 1/0041 375/259 |
| 2012/0307842 A1* | 12/2012 | Petrov | H04N 21/23608 370/474 |
| 2012/0314762 A1 | 12/2012 | Herrmann et al. | |
| 2015/0215193 A1 | 7/2015 | Kim et al. | |
| 2016/0205017 A1* | 7/2016 | Hwang | H04N 21/236 370/392 |
| 2016/0227292 A1* | 8/2016 | Okada | H04N 21/2383 |

FOREIGN PATENT DOCUMENTS

| | | |
|---|---|---|
| EP | 2555510 A2 | 2/2013 |
| KR | 10-2009-0082093 A | 7/2009 |

\* cited by examiner

| PID-Sub | | | Description | Number of case |
|---|---|---|---|---|
| [4] | [3] | [2~0] | | |
| 0 | x | x | Section PID | 0~15 |
| 1 | 0 | x | PID index in PMT | 0~7 |
| 1 | 1 | x | Reserved | 0~7 |

(a)

| PID-Sub | | | Description | Actual PID |
|---|---|---|---|---|
| [4] | [3~0] | Hexagonal | | |
| 0 | 0000 | 0x00 | PAT | 0x0000 |
| 0 | 0001 | 0x01 | CAT | 0x0001 |
| 0 | 0010 | 0x02 | TSDT | 0x0002 |
| 0 | 0011~0111 | 0x03~0x07 | reserved | |
| 0 | 1000 | 0x08 | NIT | 0x0010 |
| 0 | 1001 | 0x09 | SDT, BAT | 0x0011 |
| 0 | 1010 | 0x0A | EIT | 0x0012 |
| 0 | 1011 | 0x0B | RST | 0x0013 |
| 0 | 1100 | 0x0C | TDT,TOT | 0x0014 |
| 0 | 1101 | 0x0D | MIP | 0x0015 |
| 0 | 1110 | 0x0E | reserved | |
| 0 | 1111 | 0x0F | Null Packet | 0x1FFF |

FIG. 25

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i<N; i++) { | | |
|         descriptor() | | |
|     } | | |
|     for (i=0;i<N1;i++) { | | |
|         stream_type | 8 | uimsbf |
|         reserved | 3 | bslbf |
|         elementary_PID | 13 | uimsnf |
|         reserved | 4 | bslbf |
|         ES_info_length | 12 | uimsbf |
|         for (i=0; i<N2; i++) { | | |
|             descriptor() | | |
|         } | | |
|     } | | |
|     CRC_32 | 32 | rpchof |
| } | | |

| Sub -PID | | PID | |
|---|---|---|---|
| Sub_PID [7] | Sub_PID[6~0] | Descriptions | PID number |
| 0 | 000 0000 | PAT | 0x0000 |
| 0 | 000 0001 | CAT | 0x0001 |
| 0 | 000 0010 | TSDT | 0x0002 |
| 0 | 000 0011 ~ 111 1110 | reserved | |
| 0 | 111 1111 | Null-packet | 0x1FFF |
| 1 | 000 0000 | PMT | PMT_PID |
| 1 | 000 0001 | 1$^{st}$ elementary PID in PLS | Elementary PID |
| 1 | 000 0010 | 2$^{nd}$ elementary PID in PLS | Elementary PID |
| 1 | | | .. |
| 1 | xxx xxxxx | N$^{th}$elementary PID in PLS | Elementary PID |

(b)

| Continuity counter sync flag | Continuity counter |
|---|---|
| 1 | 0000 |
| 0 | 0001 ~ 1111 |

FIG. 31

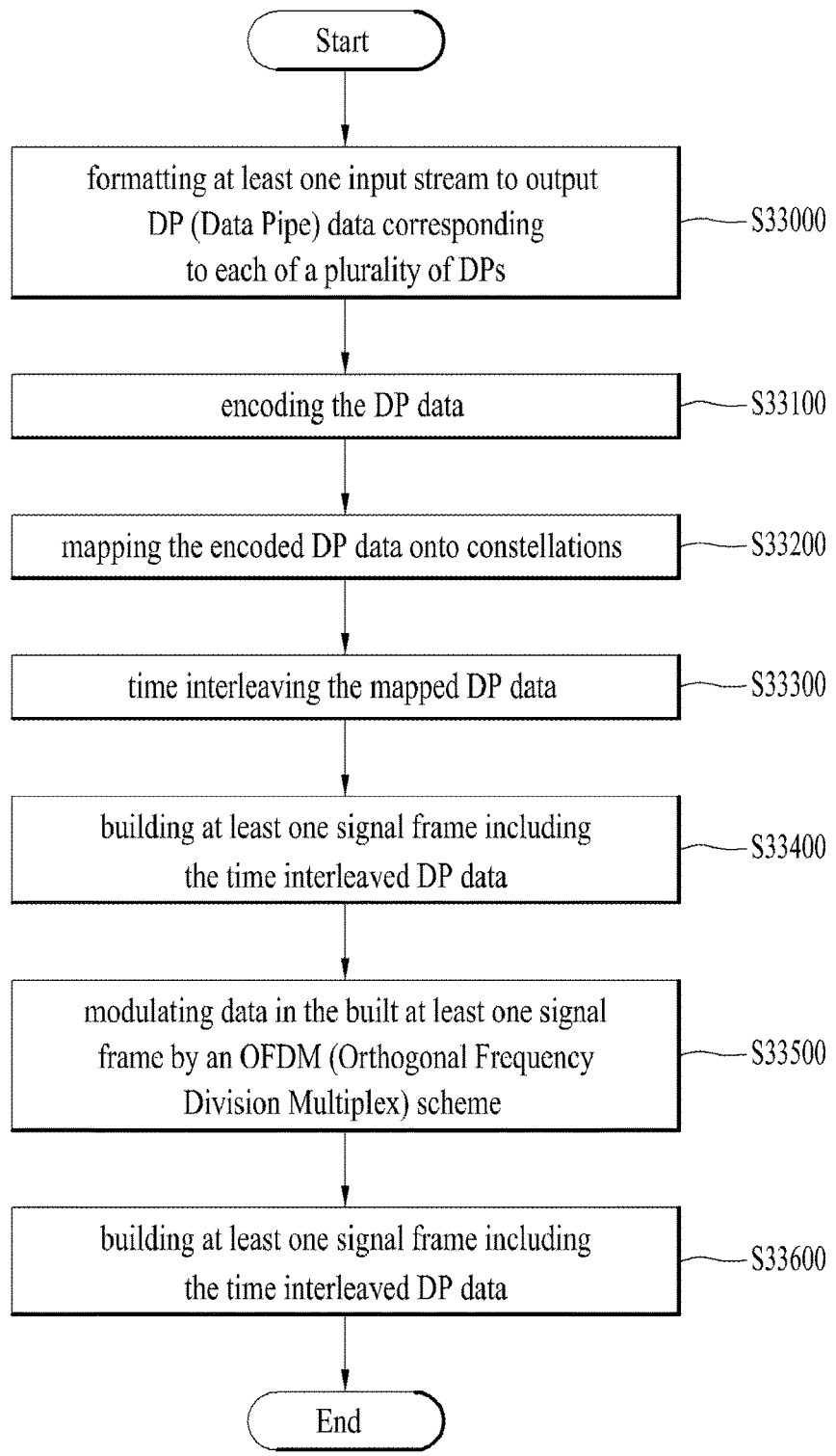

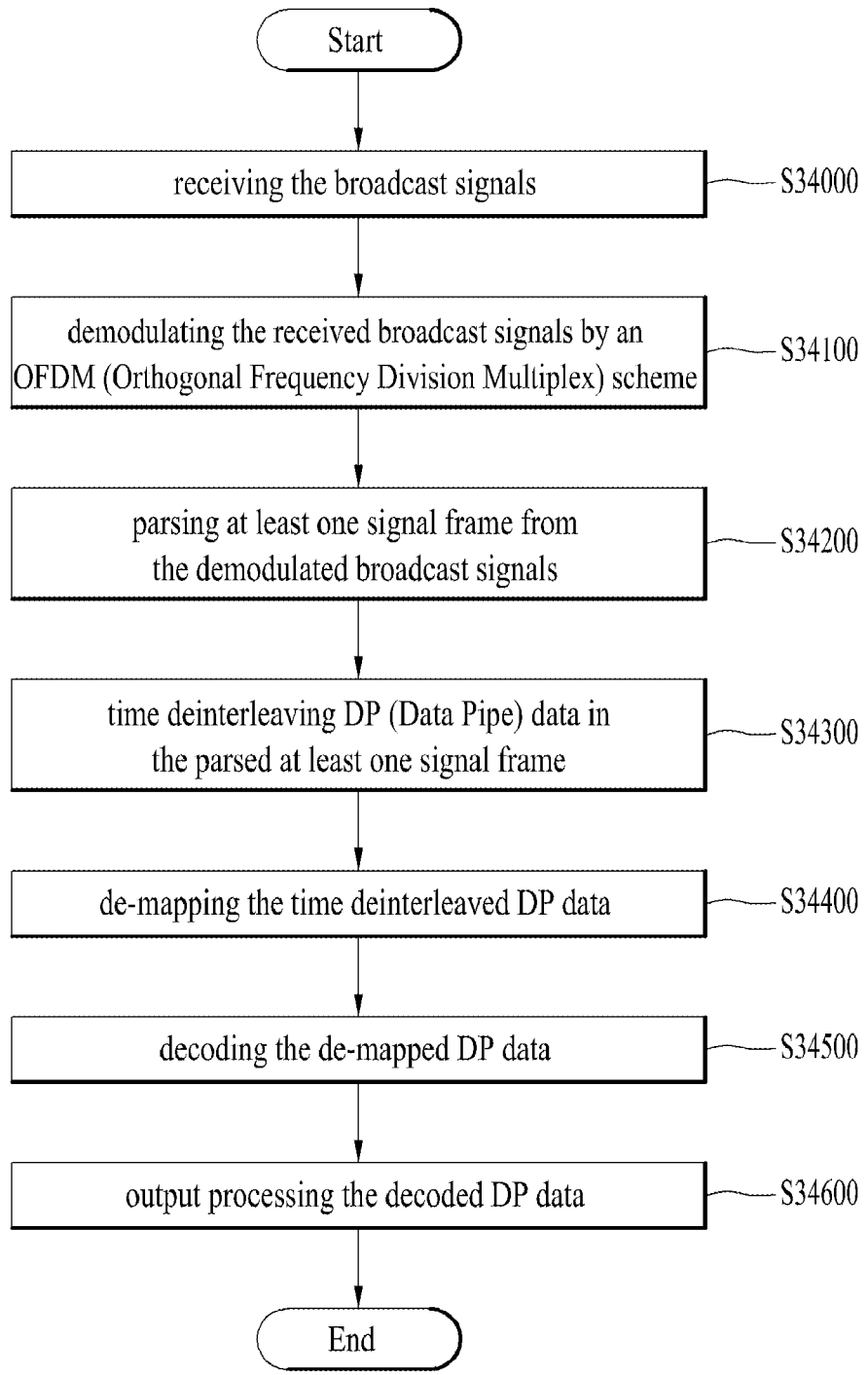

APPARATUS FOR TRANSMITTING BROADCAST SIGNALS, APPARATUS FOR RECEIVING BROADCAST SIGNALS, METHOD FOR TRANSMITTING BROADCAST SIGNALS AND METHOD FOR RECEIVING BROADCAST SIGNALS

This application is a Continuation Application of U.S. patent application Ser. No. 14/278,431, filed on May 15, 2014, and claims the benefit of U.S. Provisional Application No. 61/823,886 filed on May 15, 2013, 61/823,891 filed on May 15, 2013, and 61/883,959 filed Sep. 27, 2013 in the US, the entire contents of which is hereby incorporated by reference in their entirety.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

Accordingly, the present invention is directed to an apparatus for transmitting broadcast signals and an apparatus for receiving broadcast signals for future broadcast services and methods for transmitting and receiving broadcast signals for future broadcast services.

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

Technical Solution

To achieve the object and other advantages and in accordance with the purpose of the invention, as embodied and broadly described herein, a method for transmitting broadcast signals comprises formatting at least one input stream to output DP (Data Pipe) data corresponding to each of a plurality of DPs, wherein the each of a plurality of DPs carries at least one service or at least one service component, wherein the formatting further includes splitting the at least one input stream into the DP data having data packets and compressing a header in the each of the data packets according to a header compression mode, encoding the DP data, mapping the encoded DP data onto constellations, time interleaving the mapped DP data, building at least one signal frame including the time interleaved DP data, modulating data in the built at least one signal frame by an OFDM (Orthogonal Frequency Division Multiplex) scheme and transmitting the broadcast signals having the modulated data.

Advantageous Effects

The present invention can process data according to service characteristics to control QoS for each service or service component, thereby providing various broadcast services.

The present invention can achieve transmission flexibility by transmitting various broadcast services through the same RF signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF THE DRAWINGS

FIG. 22 is a table showing a PID-sub according to an embodiment of the present invention.

FIG. 25 is a view showing a PMT according to an embodiment of the present invention.

FIG. 27 is a view showing a table indicating a PID-sub according to another embodiment of the present invention and a mapping table for continuity counter compression.

FIG. 31 is a view showing a DNP extension method according to an embodiment of the present invention.

FIG. 33 is a flowchart illustrating a method for transmitting broadcast signals according to an embodiment of the present invention.

FIG. 34 is a flowchart illustrating a method for receiving broadcast signals according to an embodiment of the present invention.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

Figure 1:
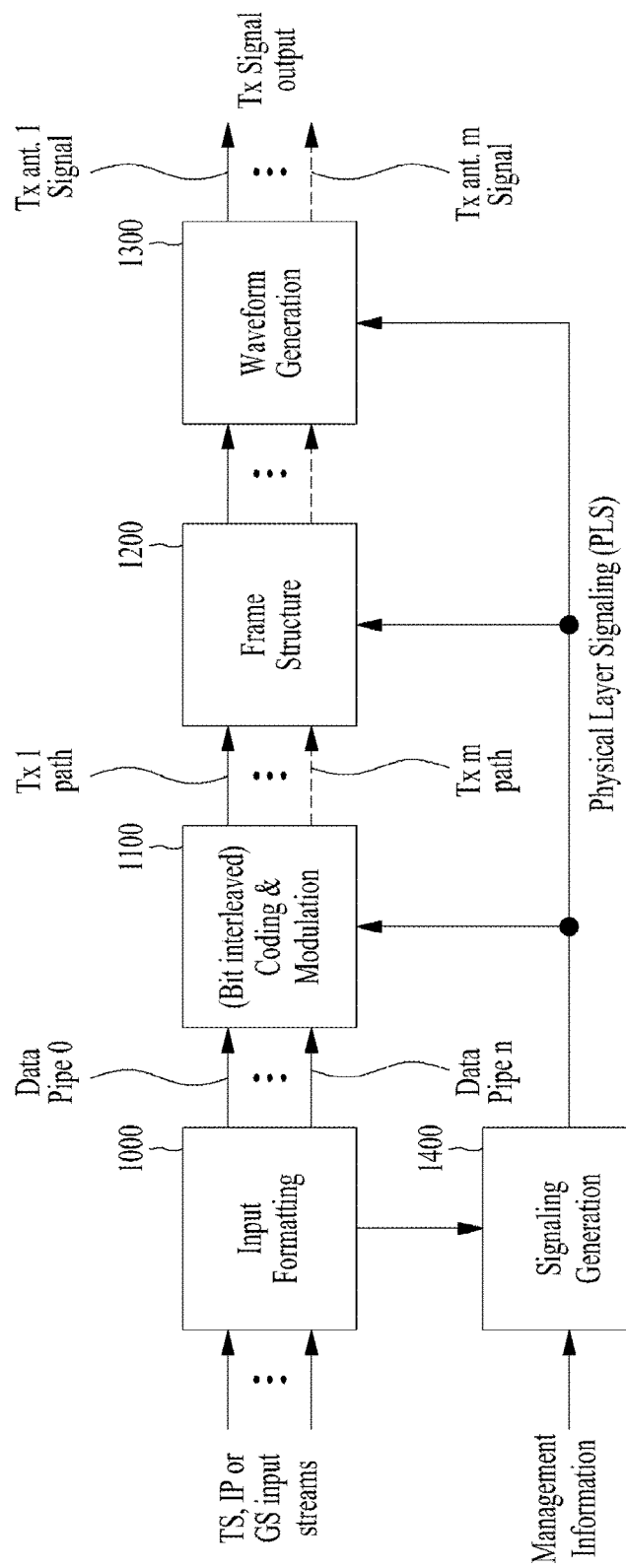
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 1, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes or DP data). The data pipe is a logical channel in the physical layer that carries service data or related metadata, which may carry one or multiple service(s) or service component(s). In addition, data transmitted through each data pipe may be called DP data.

In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 1, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 2:
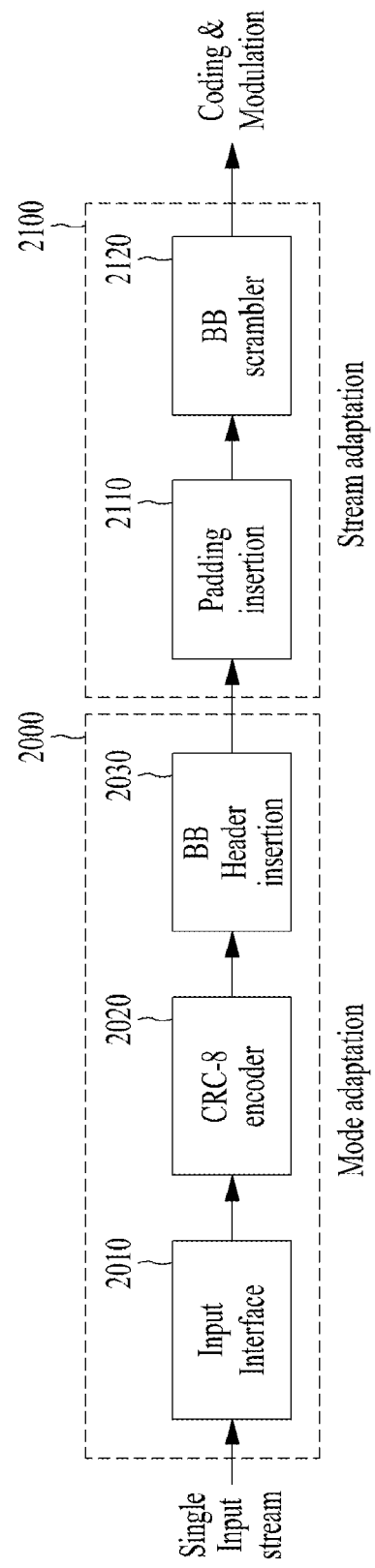
FIG. 2 illustrates an input formatting module according to an embodiment of the present invention.
Figure 3:
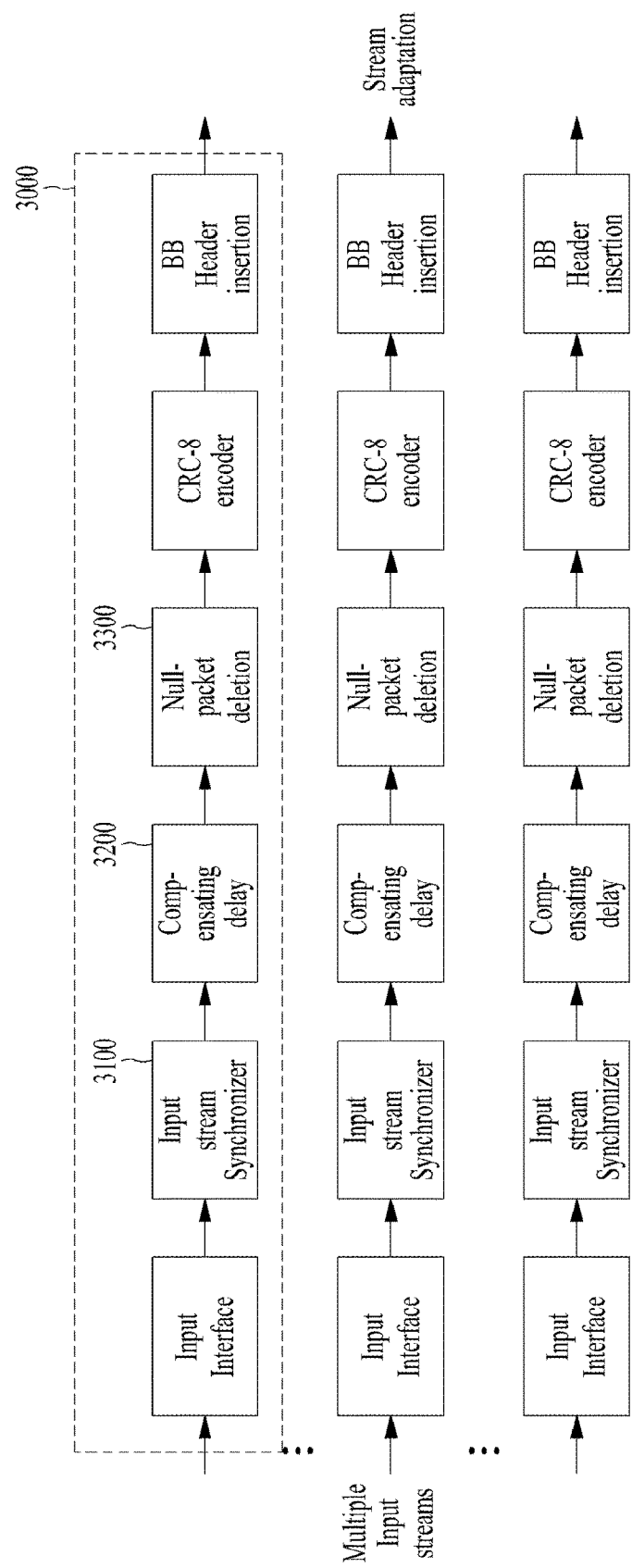
FIG. 3 illustrates an input formatting module according to another embodiment of the present invention.
Figure 4:
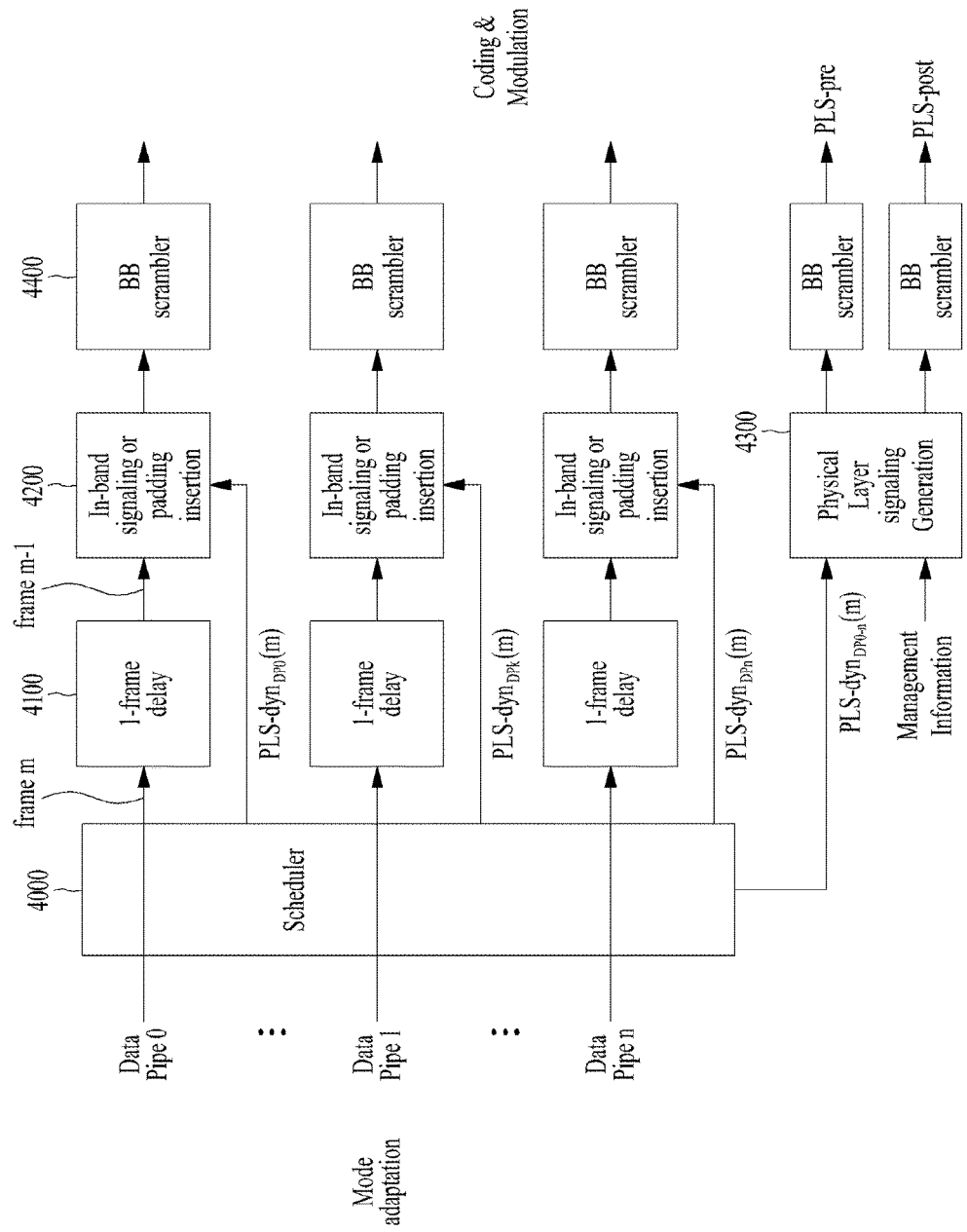
FIG. 4 illustrates an input formatting module according to another embodiment of the present invention.

FIGS. 2, 3 and 4 illustrate the input formatting module 1000 according to embodiments of the present invention. A description will be given of each figure.

FIG. 2 illustrates an input formatting module according to one embodiment of the present invention. FIG. 2 shows an input formatting module when the input signal is a single input stream.

Referring to FIG. 2, the input formatting module according to one embodiment of the present invention can include a mode adaptation module 2000 and a stream adaptation module 2100.

As shown in FIG. 2, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into the BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 2, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 2, the input formatting module can finally output data pipes to the coding & modulation module.

FIG. 3 illustrates an input formatting module according to another embodiment of the present invention. FIG. 3 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 3, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 2 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 4 illustrates an input formatting module according to another embodiment of the present invention.

Specifically, FIG. 4 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-to-cell demux block, a cell interleaver block, a time interleaver block, etc. included in the coding & modulation module illustrated in FIG. 1.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 4, scrambling of the BB scrambler block 4400 is applicable to both data pipes and physical layer signaling information.

The above-described blocks may be omitted or replaced by blocks having similar or identical functions according to designer.

As shown in FIG. 4, the stream adaptation module can finally output the data pipes to the coding & modulation module.

Figure 5:
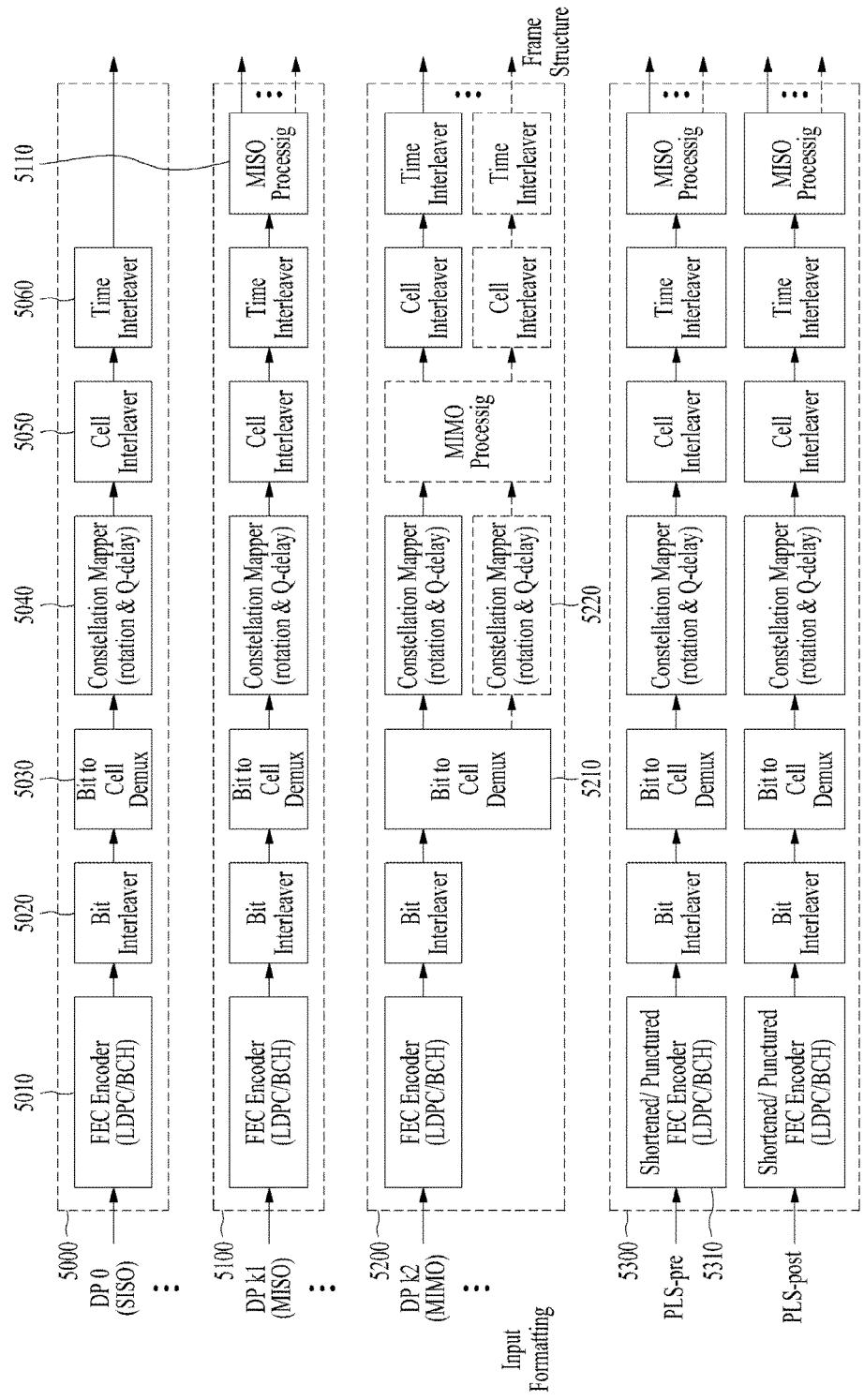
FIG. 5 illustrates a coding & modulation module according to an embodiment of the present invention.

FIG. 5 illustrates a coding & modulation module according to an embodiment of the present invention.

The coding & modulation module shown in FIG. 5 corresponds to an embodiment of the coding & modulation module illustrated in FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 5 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

In addition, the bit interleaver block 5020 is located between the FEC encoder block 5010 and the constellation mapper block 5040 and can connect output bits of LDPC encoding performed by the FEC encoder block 5010 to bit positions having different reliability values and optimal values of the constellation mapper in consideration of LDPC decoding of the apparatus for receiving broadcast signals. Accordingly, the bit-to-cell demux block 5030 can be replaced by a block having a similar or equal function.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

In addition, the constellation mapper block 5040 can move constellation points on a two-dimensional plane in order to find optimal constellation points. Through this process, capacity of the coding & modulation module 1100 can be optimized. Furthermore, the constellation mapper block 5040 can perform the above-described operation using IQ-balanced constellation points and rotation. The constellation mapper block 5040 can be replaced by a block having a similar or equal function.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 5. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 5, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad 0s corresponding to a desired input bit stream length necessary for normal LDPC encoding, carry out LDPC encoding and then remove the padded 0s to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 5, the coding & modulation module can output the data pipes (or DP data), PLS-pre information and PLS-post information processed for the respective paths to the frame structure module.

Figure 6:
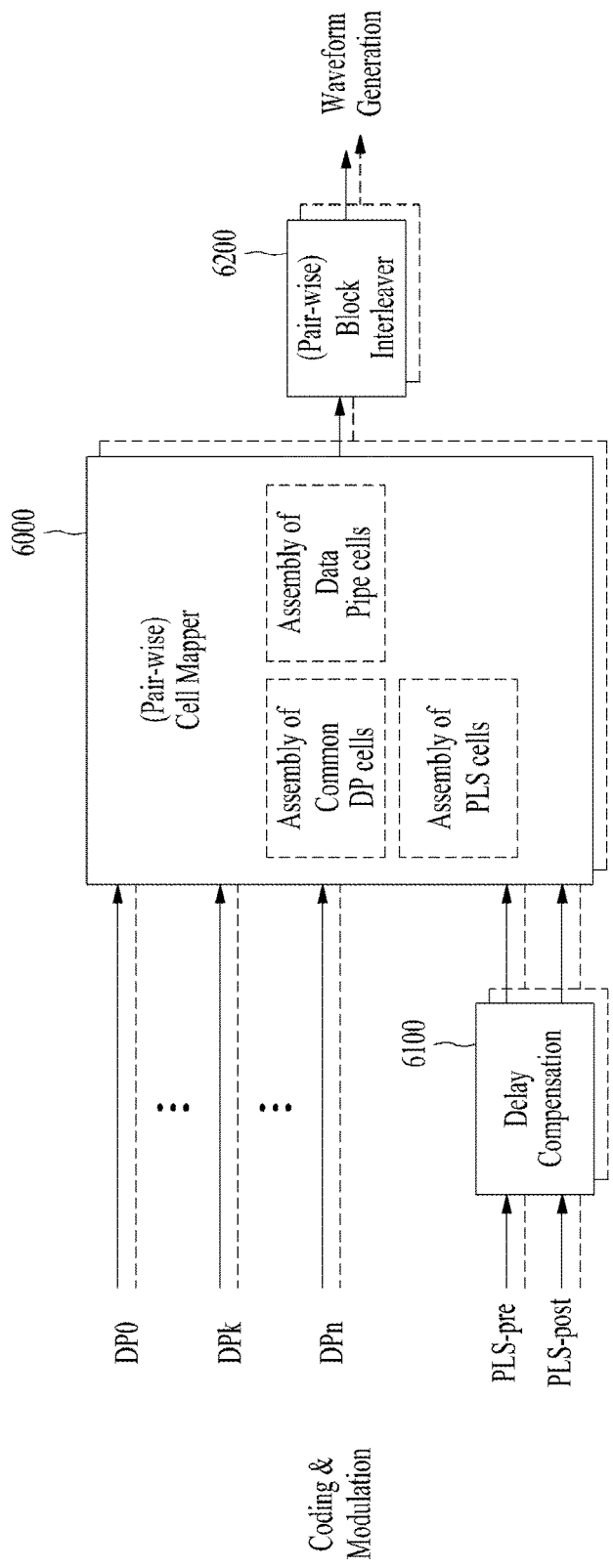
FIG. 6 illustrates a frame structure module according to an embodiment of the present invention.

FIG. 6 illustrates a frame structure module according to one embodiment of the present invention.

The frame structure module shown in FIG. 6 corresponds to an embodiment of the frame structure module 1200 illustrated in FIG. 1.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map the unit to a frame. Accordingly, paired cells in an input path corresponding to an output path of each antenna can be allocated to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

As illustrated in FIG. 6, the frame structure module can output at least one signal frame to the waveform generation module.

Figure 7:
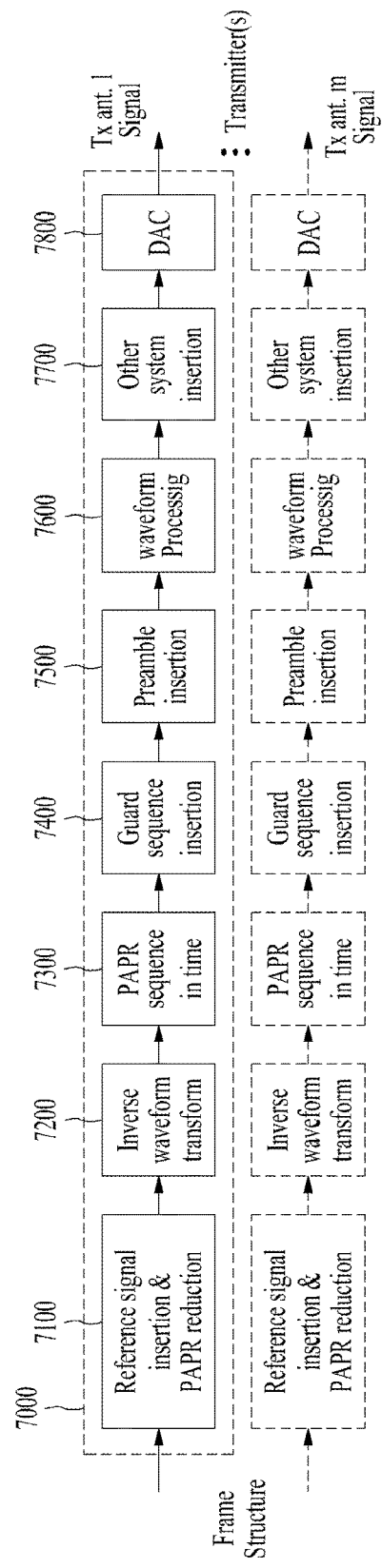
FIG. 7 illustrates a waveform generation module according to an embodiment of the present invention.

FIG. 7 illustrates a waveform generation module according to an embodiment of the present invention.

The waveform generation module illustrated in FIG. 7 corresponds to an embodiment of the waveform generation module 1300 described with reference to FIG. 1.

The waveform generation module according to an embodiment of the present invention can modulate and transmit as many signal frames as the number of antennas for receiving and outputting signal frames output from the frame structure module illustrated in FIG. 6.

Specifically, the waveform generation module illustrated in FIG. 7 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through in output antennas. A Tx antenna according to an embodiment of the present invention can have vertical or horizontal polarity.

The above-described blocks may be omitted or replaced by blocks having similar or identical functions according to design.

Figure 8:
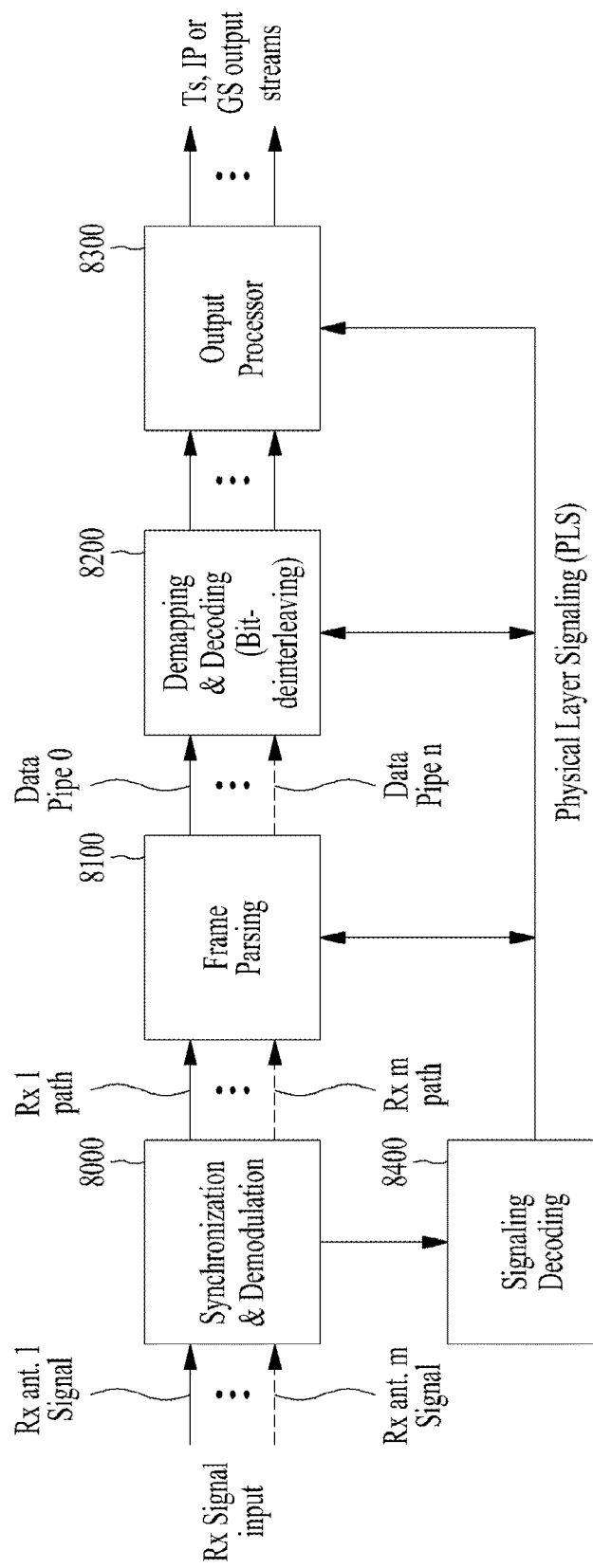
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 9:
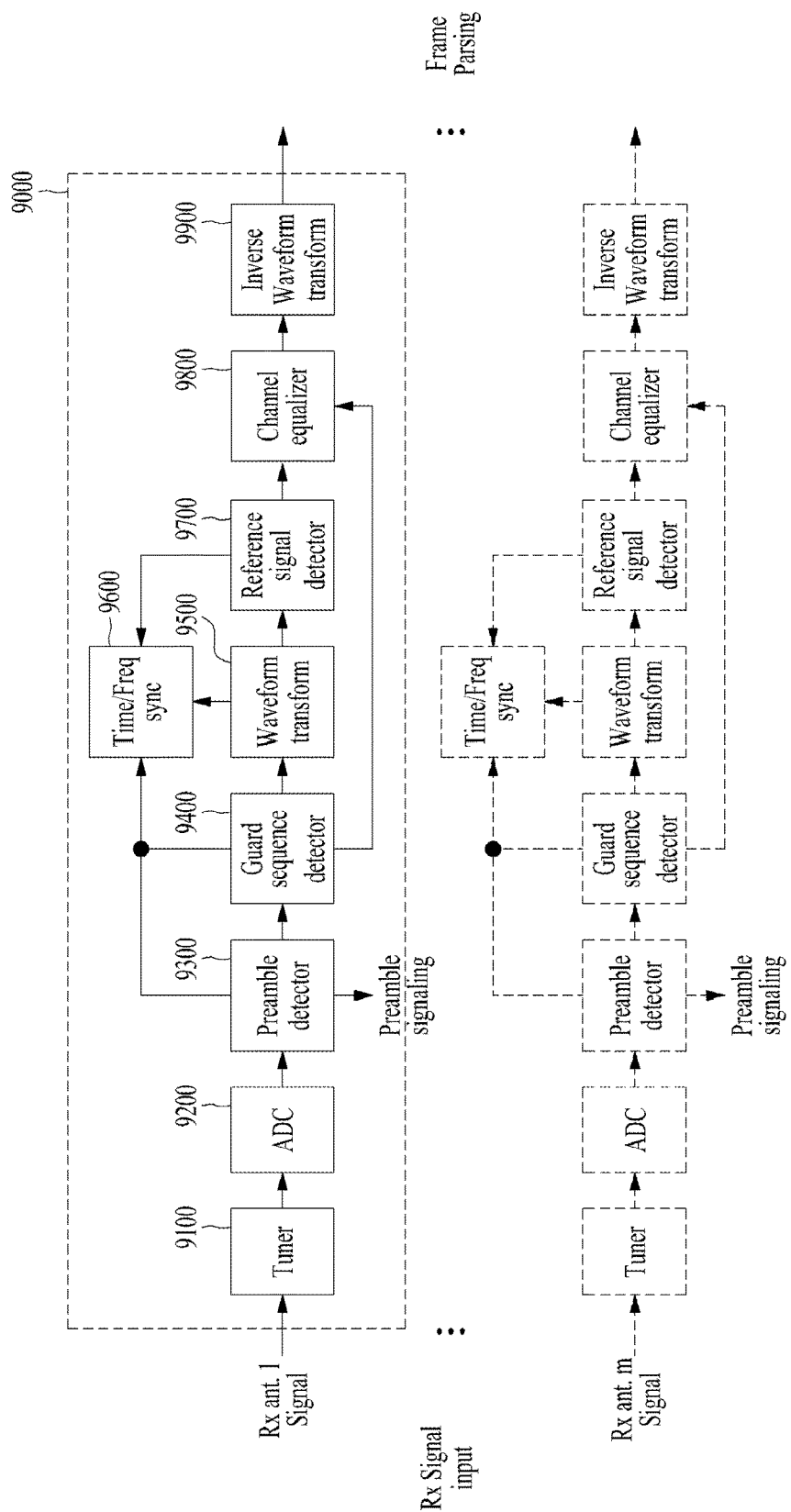
FIG. 9 illustrates a synchronization & demodulation module according to an embodiment of the present invention.

FIG. 9 illustrates a synchronization & demodulation module according to an embodiment of the present invention.

The synchronization & demodulation module shown in FIG. 9 corresponds to an embodiment of the synchronization & demodulation module described with reference to FIG. 8. The synchronization & demodulation module shown in FIG. 9 can perform a reverse operation of the operation of the waveform generation module illustrated in FIG. 7.

As shown in FIG. 9, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 10:
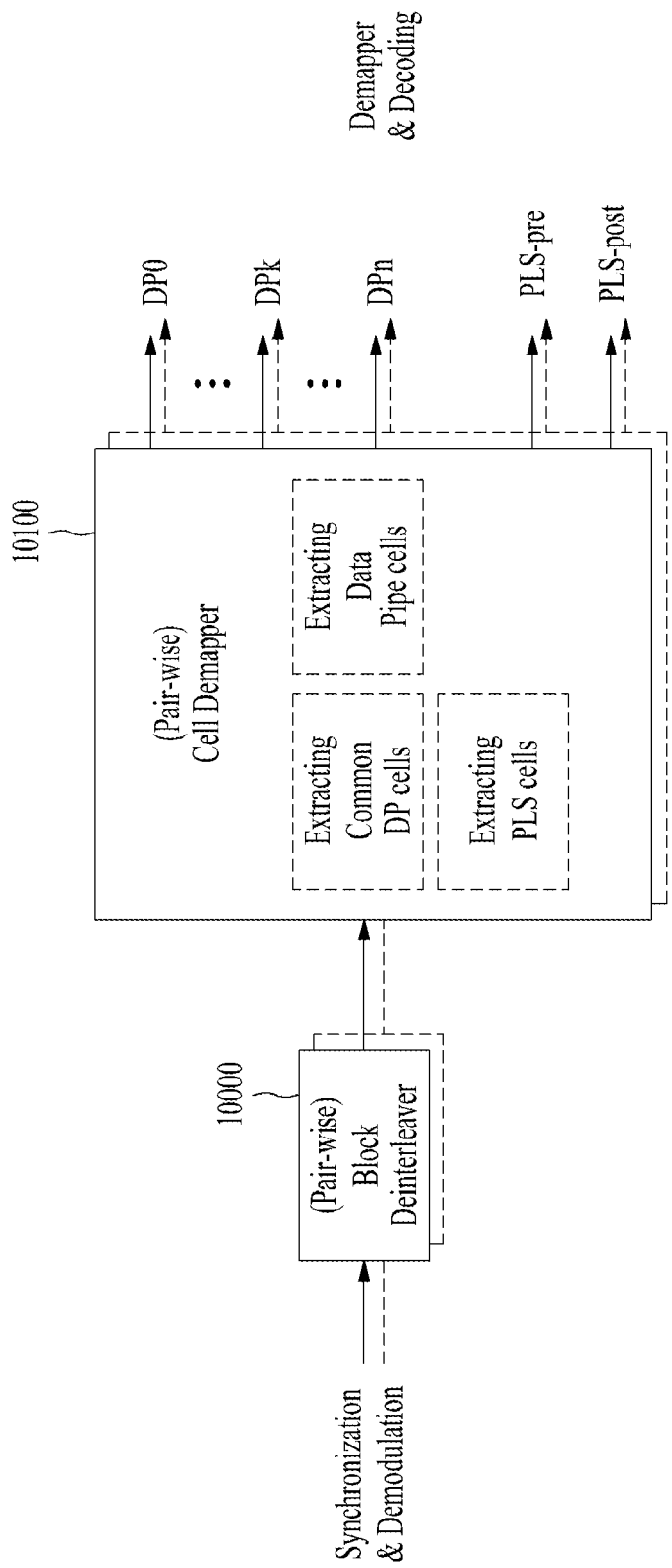
FIG. 10 illustrates a frame parsing module according to an embodiment of the present invention.

FIG. 10 illustrates a frame parsing module according to an embodiment of the present invention.

The frame parsing module illustrated in FIG. 10 corresponds to an embodiment of the frame parsing module described with reference to FIG. 8. The frame parsing module shown in FIG. 10 can perform a reverse operation of the operation of the frame structure module illustrated in FIG. 6.

As shown in FIG. 10, the frame parsing module according to an embodiment of the present invention can include at least one block deinterleaver 10000 and at least one cell demapper 10100.

The block deinterleaver 10000 can deinterleave data input through data paths of the m Rx antennas and processed by the synchronization & demodulation module on a signal block basis. In this case, if the apparatus for transmitting broadcast signals performs pair-wise interleaving as illustrated in FIG. 8, the block deinterleaver 10000 can process two consecutive pieces of data as a pair for each input path. Accordingly, the block interleaver 10000 can output two consecutive pieces of data even when deinterleaving has been performed. Furthermore, the block deinterleaver 10000 can perform a reverse operation of the interleaving operation performed by the apparatus for transmitting broadcast signals to output data in the original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 6, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 11:
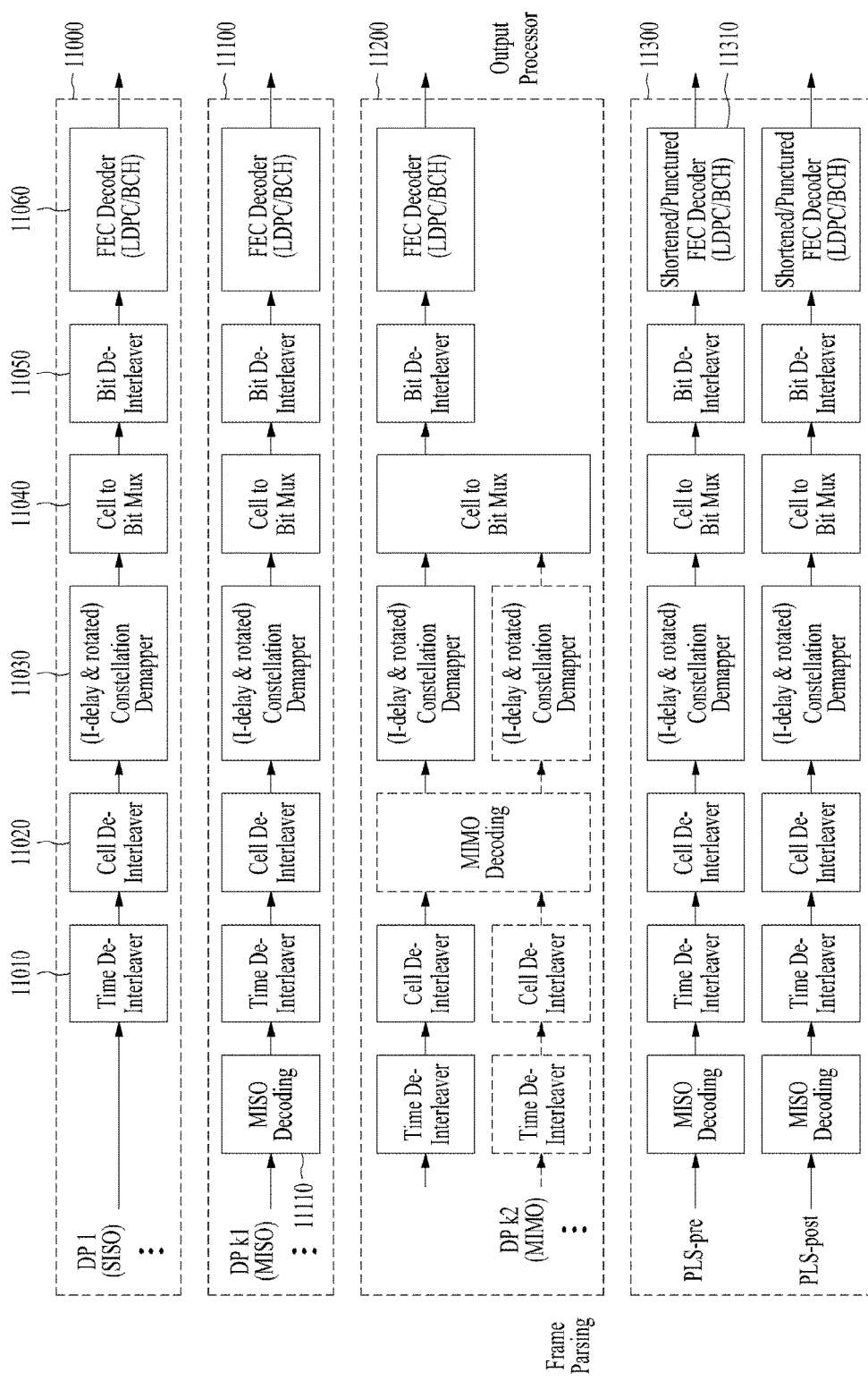
FIG. 11 illustrates a demapping & decoding module according to an embodiment of the present invention.

FIG. 11 illustrates a demapping & decoding module according to an embodiment of the present invention.

The demapping & decoding module shown in FIG. 11 corresponds to an embodiment of the demapping & decoding module illustrated in FIG. 8. The demapping & decoding module shown in FIG. 11 can perform a reverse operation of the operation of the coding & modulation module illustrated in FIG. 5.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 11 can include blocks for processing data output from the frame parsing module according to SISO, MISO and MIMO in response to the apparatus for transmitting broadcast signals.

As shown in FIG. 11, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 11 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 5. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 5. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 5. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 5. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 5. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 5. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 11. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 5. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 11. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 5. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 5.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 5. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 11.

Figure 12:
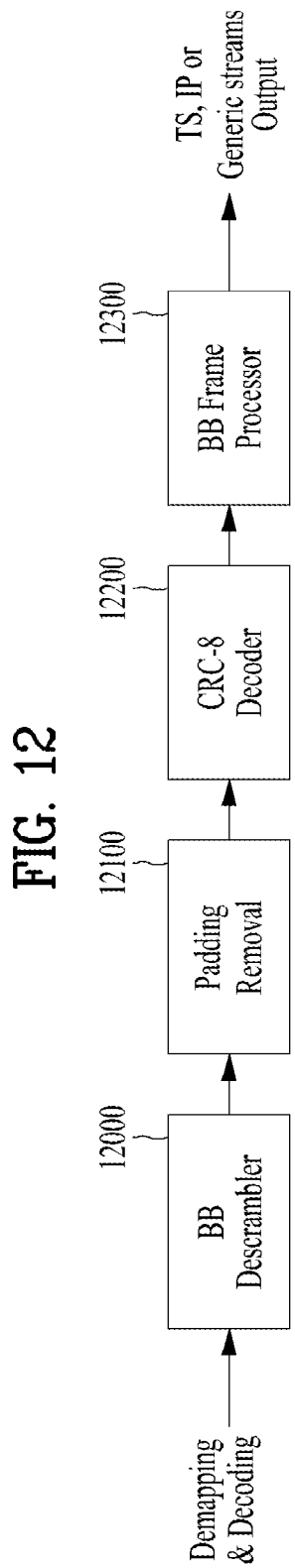
FIG. 12 illustrates an output processor according to an embodiment of the present invention.
Figure 13:
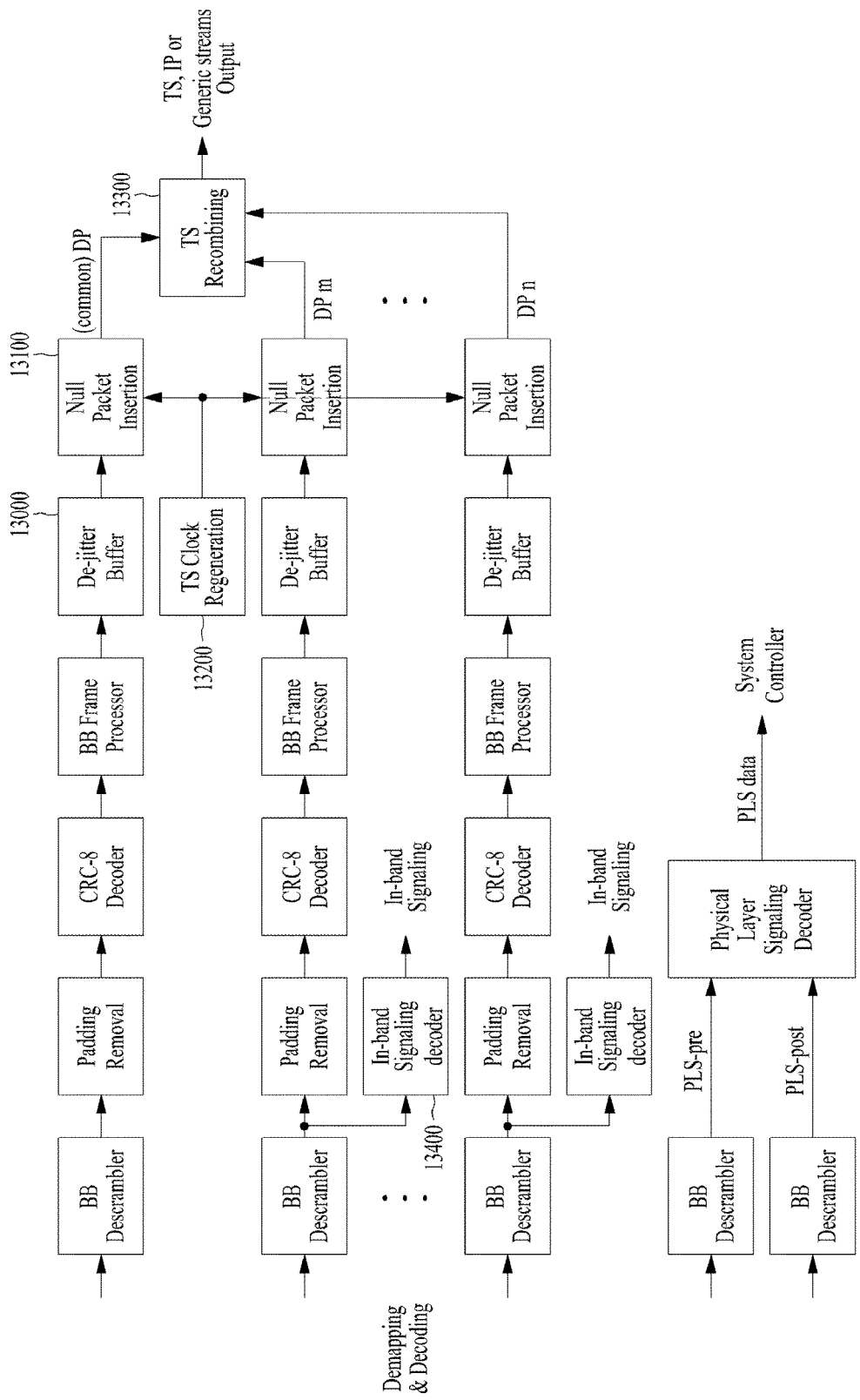
FIG. 13 illustrates an output processor according to another embodiment of the present invention.

FIGS. 12 and 13 illustrate output processors according to embodiments of the present invention.

FIG. 12 illustrates an output processor according to an embodiment of the present invention. The output processor illustrated in FIG. 12 corresponds to an embodiment of the output processor illustrated in FIG. 8. The output processor illustrated in FIG. 12 receives a single data pipe output from the demapping & decoding module and outputs a single output stream. The output processor can perform a reverse operation of the operation of the input formatting module illustrated in FIG. 2.

The output processor shown in FIG. 12 can include a BB scrambler block 12000, a padding removal block 12100, a CRC-8 decoder block 12200 and a BB frame processor block 12300.

The BB scrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 13 illustrates an output processor according to another embodiment of the present invention. The output processor shown in FIG. 13 corresponds to an embodiment of the output processor illustrated in FIG. 8. The output processor shown in FIG. 13 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 13 can include a BB descrambler block, a padding removal block, a CRC-8 decoder block and a BB frame processor block as the output processor illustrated in FIG. 12. The basic roles of these blocks correspond to those of the blocks described with reference to FIG. 12 although operations thereof may differ from those of the blocks illustrated in FIG. 12.

A de-jitter buffer block 13000 included in the output processor shown in FIG. 13 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 13 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 14:
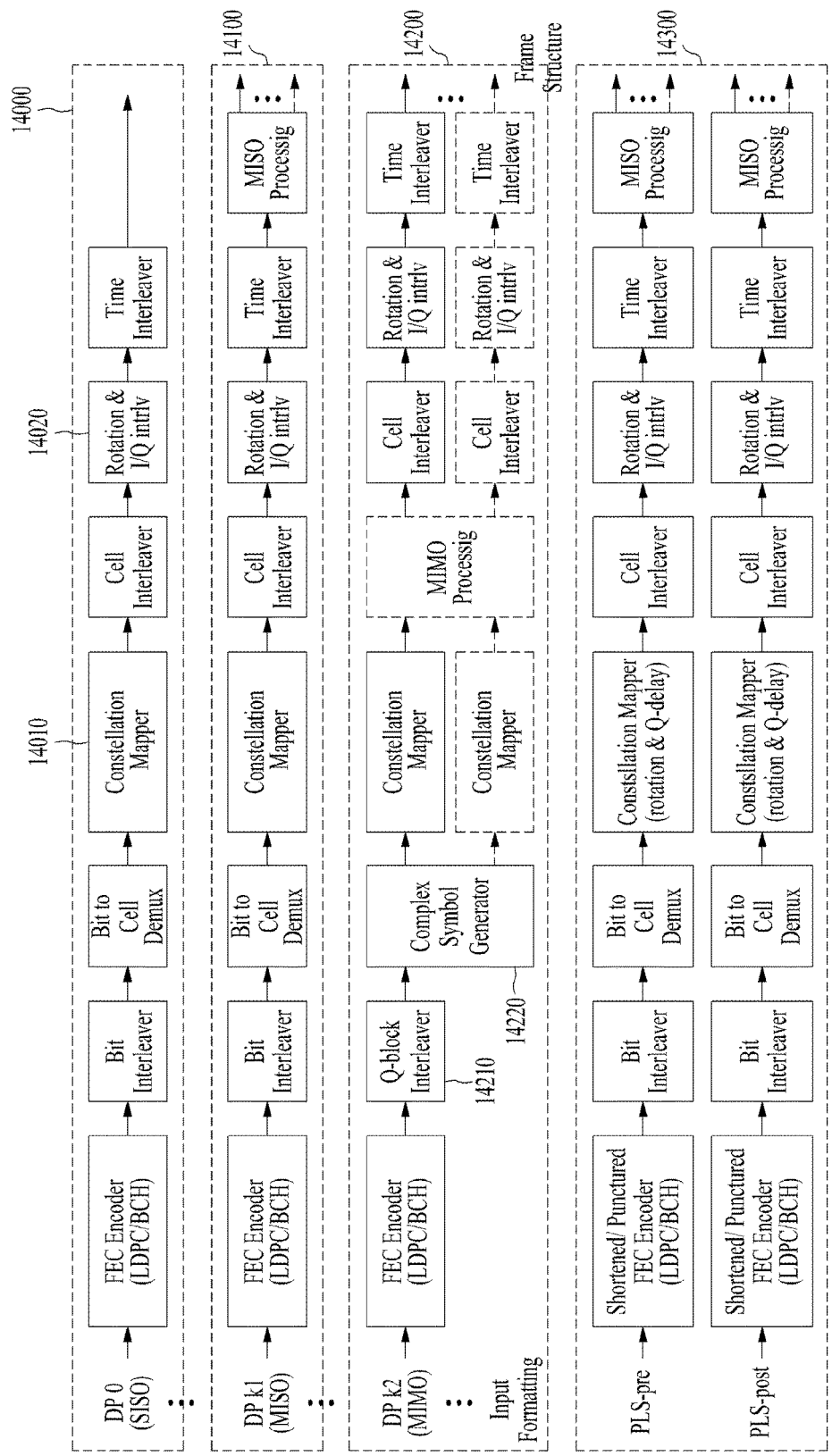
FIG. 14 illustrates a coding & modulation module according to another embodiment of the present invention.

FIG. 14 illustrates a coding & modulation module according to another embodiment of the present invention.

The coding & modulation module shown in FIG. 14 corresponds to another embodiment of the coding & modulation module illustrated in FIGS. 1 to 5.

To control QoS for each service or service component transmitted through each data pipe, as described above with reference to FIG. 5, the coding & modulation module shown in FIG. 14 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 14 are similar to the first to fourth blocks 5000 to 5300 illustrated in FIG. 5.

However, the first to fourth blocks 14000 to 14300 shown in FIG. 14 are distinguished from the first to fourth blocks 5000 to 5300 illustrated in FIG. 5 in that a constellation mapper 14010 included in the first to fourth blocks 14000 to 14300 has a function different from the first to fourth blocks 5000 to 5300 illustrated in FIG. 5, a rotation & I/Q interleaver block 14020 is present between the cell interleaver and the time interleaver of the first to fourth blocks 14000 to 14300 illustrated in FIG. 14 and the third block 14200 for MIMO has a configuration different from the third block 5200 for MIMO illustrated in FIG. 5. The following description focuses on these differences between the first to fourth blocks 14000 to 14300 shown in FIG. 14 and the first to fourth blocks 5000 to 5300 illustrated in FIG. 5.

The constellation mapper block 14010 shown in FIG. 14 can map an input bit word to a complex symbol. However, the constellation mapper block 14010 may not perform constellation rotation, differently from the constellation mapper block shown in FIG. 5. The constellation mapper block 14010 shown in FIG. 14 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & I/Q interleaver block 14020 is two or more which can be changed by the designer. In addition, the rotation & I/Q interleaver block 14020 may not interleave the in-phase component.

The rotation & I/Q interleaver block 14020 is commonly applicable to the first to fourth blocks 14000 to 14300, as described above. In this case, whether or not the rotation & I/Q interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 14.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 14, can output data pipes, PLS-pre information and PLS-post information processed for respective paths to the frame structure module.

Figure 15:
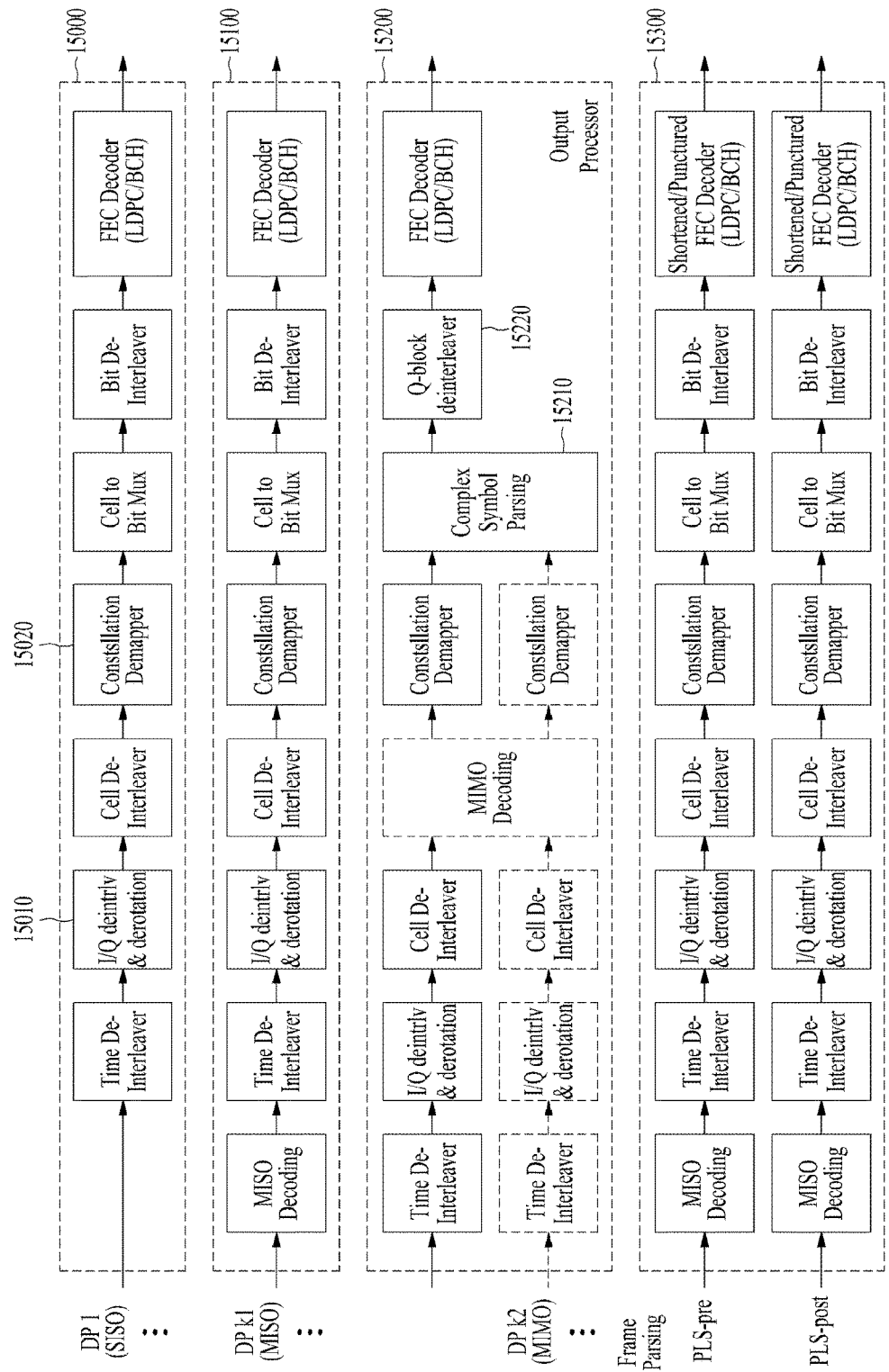
FIG. 15 illustrates a demapping & decoding module according to another embodiment of the present invention.

FIG. 15 illustrates a demapping & decoding module according to another embodiment of the present invention.

The demapping & decoding module shown in FIG. 15 corresponds to another embodiment of the demapping & decoding module illustrated in FIG. 11. The demapping & decoding module shown in FIG. 15 can perform a reverse operation of the operation of the coding & modulation module illustrated in FIG. 14.

As shown in FIG. 15, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 15 are similar to the first to fourth blocks 11000 to 11300 illustrated in FIG. 11.

However, the first to fourth blocks 15000 to 15300 shown in FIG. 15 are distinguished from the first to fourth blocks 11000 to 11300 illustrated in FIG. 11 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 11 and the third block 15200 for MIMO has a configuration different from the third block 11200 for MIMO illustrated in FIG. 11. The following description focuses on these differences between the first to fourth blocks 15000 to 15300 shown in FIG. 15 and the first to fourth blocks 11000 to 11300 illustrated in FIG. 11.

The I/Q deinterleaver & derotation block 15010 can perform a reverse process of the process performed by the rotation & I/Q interleaver block 14020 illustrated in FIG. 14. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 14. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 15.

The complex symbol parsing block 15210 can perform a reverse process of the process performed by the complex symbol generator block 14220 illustrated in FIG. 14. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 14. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 15, the demapping & decoding module according to another embodiment of the present invention can output data pipes and PLS information processed for respective paths to the output processor.

As described above, the apparatus and method for transmitting broadcast signals according to an embodiment of the present invention can multiplex signals of different broadcast transmission/reception systems within the same RF channel and transmit the multiplexed signals and the apparatus and method for receiving broadcast signals according to an embodiment of the present invention can process the signals in response to the broadcast signal transmission operation. Accordingly, it is possible to provide a flexible broadcast transmission and reception system.

A conventional broadcast signal transmitting apparatus uses a mode to perform transmission while deleting the sync byte of the TS header to input the TS packets (or data pacekts) in the input streams as a BB frame such that the 4 byte header can be transmitted as the 3 byte header. Alternatively, the conventional broadcast signal transmitting apparatus uses a mode to compress a PID since, in a case in which only the TS packet of one PID is transmitted to one DP, the PID is continuously transmitted. In the mode to compress the PID, one byte is compressed and the same PID and TP value are always input to the BB-frame heater, whereby improving compression efficiency. In a case in which the sync byte is deleted, however, a compression rate is low. In addition, the mode to compress the PID has a disadvantage in that the PID must be the same.

Hereinafter, a header compression mode according to an embodiment of the present invention will be described.

A broadcast signal transmitting apparatus according to an embodiment of the present invention may perform header compression to improve transmission efficiency for both TS and IP input streams. Because the receiver can have a priori information on certain parts of the header, this known information can be deleted in the transmitter.

For Transport Stream, the receiver has a-priori information about the sync-byte configuration and the packet length. If the input TS stream carries content that has only one PID, i.e., for only one service component (video, audio, etc.) or service sub-component (SVC base layer, SVC enhancement layer, MVC base view or MVC dependent views), TS packet header compression can be applied to the Transport Stream. Also, if the input TS carries content that has only one PMT (Program Map Table) and multiple video and audio PIDs in one PLP, TS packet header compression can be applied to it as well.

The header compression mode according to the embodiment of the present invention may include a Sync byte deletion mode to delete only the Sync byte, a PID compression mode to compress the PID for the same service, and a PID deletion mode to delete the PID.

Figure 16:
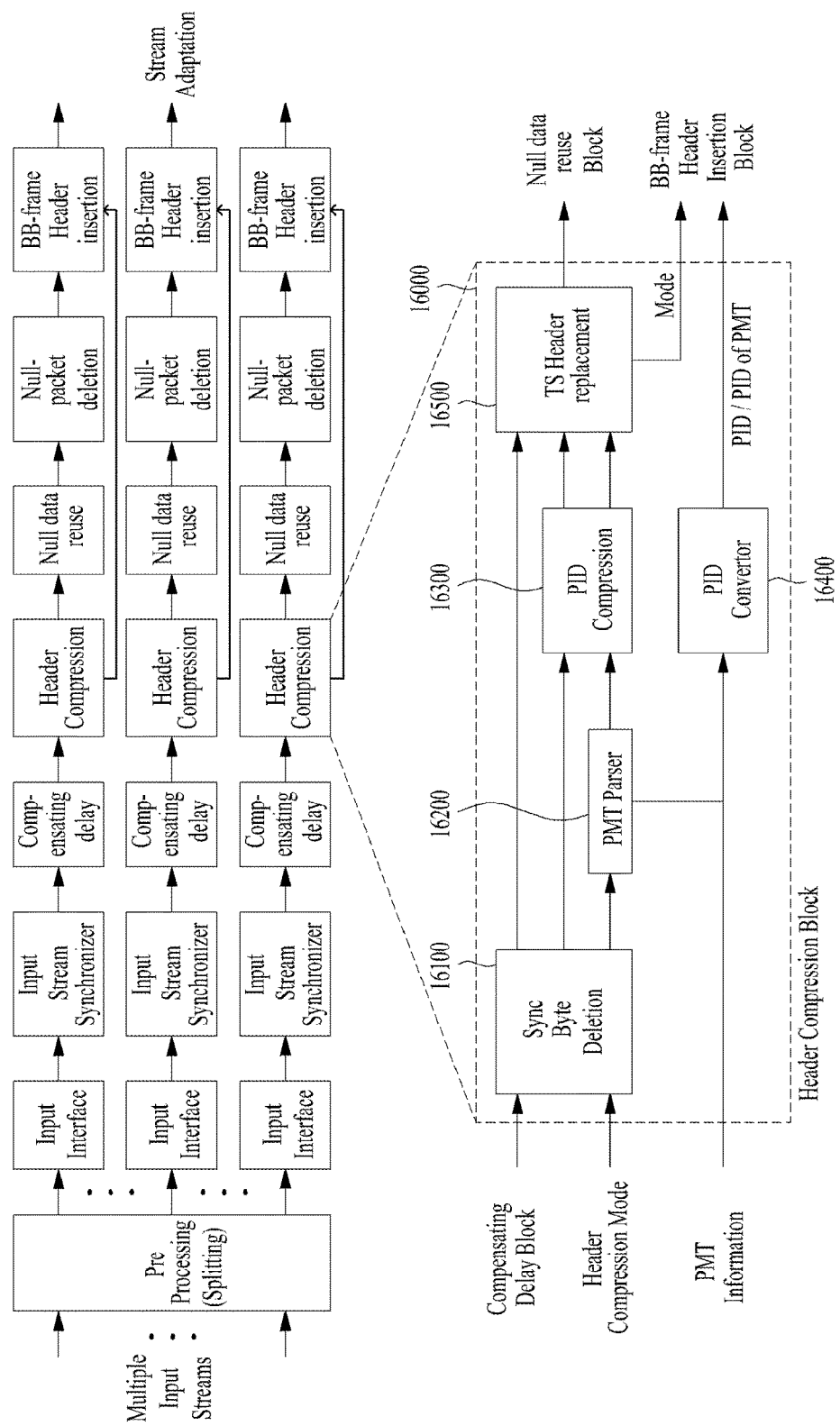
FIG. 16 is a view showing a header compression block according to an embodiment of the present invention.

FIG. 16 is a view showing a header compression block according to an embodiment of the present invention.

The upper end of FIG. 16 shows another embodiment of the mode adaptation module of the input formatting module according to the present invention described with reference to FIG. 3 and the lower end of FIG. 16 is a view showing detailed blocks included in the header compression block 16000 included in the mode adaptation module.

As described above, the mode adaptation module of the input formatting module to process the multiple input streams may independently process the respective input streams.

As shown in FIG. 16, the mode adaptation module to respectively process the multiple input streams may include a pre-processing block (Splitter), an input interface block, an input stream synchronizer block, a compensating delay block, a header compression block, a null data reuse block, a null packet deletion block, and a BB header insertion block. The input interface block, the input stream synchronizer block, the compensating delay block, the null packet deletion block, and the BB header insertion block are identical to those described with reference to FIG. 3 and, therefore, a detailed description thereof will be omitted.

The pre-processing block may split the input TS, IP, GS streams into multiple service or service component (audio, video, etc.) streams.

The header compression block 16000 shown in the lower end of FIG. 16 shows an operation of performing header compression with respect to the TS input stream. Specifically, the header compression block 16000 according to the embodiment of the present invention may compress the TS packet header corresponding to 4 byte out of 188 byte when receiving the TS input stream and may compress the PID while deleting the Sync byte according to a compression mode.

The header compression block 16000 according to the embodiment of the present invention may include a Sync byte deletion 16100, a PMT parser 16200, a PID compression 16300, a PID converter 16400, and a TS header replacement 16500.

The header compression block 16000 according to the embodiment of the present invention may differently process the input signal according to the header compression mode. As previously described, the header compression mode according to the embodiment of the present invention may include a Sync byte deletion mode to delete only the Sync byte, a PID compression mode to compress the PID for the same service, and a PID deletion mode to delete the PID. Hereinafter, operations of the blocks included in the header compression block 16000 based on the respective modes will be described.

1) In the Sync byte deletion mode, the Sync byte deletion 16100 may delete the Sync byte from the input signal and the TS header replacement 16500 may transmit the compressed TS header.

2) The PID compression mode is a mode to process the TS streams having the same service. That is, TS stream has one PMT packet PID value and one or multiple service packet(s) with differing PID(s). In this case, the Sync byte deletion 16100 may delete the Sync byte from the input signal, the PMT parser 16200 may parse the PMT section describing the PID of the same service from the data output from the Sync byte deletion 16100 to analyze the respective elementary PIDs. Subsequently, the PID converter 16400 may convert the PID into PID-SUB (or sub PID) using information output from the PMT parser 16200. PID-sub is an index of elementary PID at PMT syntax & section. Subsequently, the PID compression 16300 may compress the PID using the PID-Sub information and the TS header replacement 16500 may transmit the compressed TS header.

3) The PID deletion mode should be applied to a single TS packet stream that has only one PID. In this case, the Sync byte deletion 16100 may delete the Sync byte and the PID compression 16300 may transmit common PID information to the BB-frame header insertion block and delete the PID. Subsequently, the TS header replacement 16500 may transmit the compressed TS header.

Figure 17:
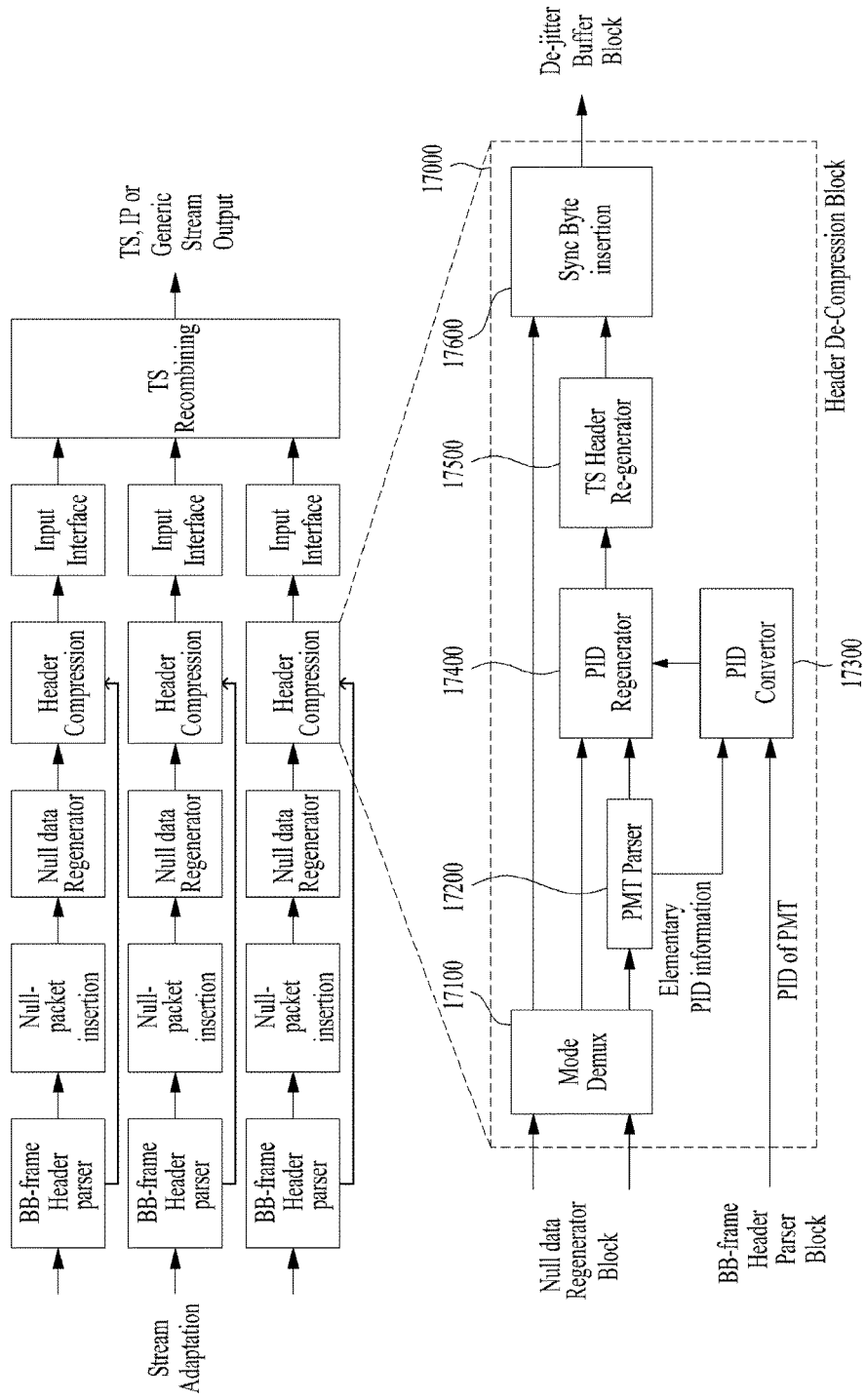
FIG. 17 is a view showing a header de-compression block according to an embodiment of the present invention.

FIG. 17 is a view showing a header de-compression block according to an embodiment of the present invention.

The upper end of FIG. 17 shows another embodiment of the output processor according to the present invention described with reference to FIG. 13 and the lower end of FIG. 17 is a view showing detailed blocks included in the header de-compression block 17000 included in the output processor.

The output processor shown in FIG. 17 may perform the reverse process of the mode adaptation module described with reference to FIG. 16.

As shown in FIG. 17, the output processor according to the embodiment of the present invention may include a BB frame header parser block, a null packet insertion block, a null data regenerator block, a header de-compression block, a de-jitter buffer block, a TS clock regeneration block, and a TS recombining bloc. Operations of the respective blocks correspond to the reverse processes of the blocks shown in FIG. 16 and, therefore, a detailed description thereof will be omitted.

The header de-compression block 17000 shown in the lower end of FIG. 17 may perform the reverse process of the header compression block 16000 as described above.

As shown in FIG. 17, the header de-compression block 17000 may include a mode demux 17100, a PMT parser 17200, a PID convertor 17300, a PID regenerator 17400, a TS header regenerator 17500, and a sync byte insertion 17600.

In the same manner as in the header compression block 16000 as described above, the header de-compression block 17000 may differently perform the process according to the Header compression mode applied to the transmission end. The header compression mode according to the embodiment of the present invention may include a Sync byte deletion mode to delete only the Sync byte, a PID compression mode to compress the PID for the same service, and a PID deletion mode to delete the PID. Hereinafter, operations of the blocks included in the header de-compression block 17000 based on the respective modes will be described.

1) In the Sync byte deletion mode, the sync byte insertion 17600 may restore the Sync byte according to the header compression mode information output from the mode demux 17100.

2) In the PID compression mode, the PMT parser 17200 may receive the PMT according to the header compression mode information output from the mode demux 17100 and transmit an elementary PID value included in the PMT to the PID convertor 17300. The PID convertor 17300 may restore the compressed PID using the same. The PID regenerator 17400 may restore the PID values of data and the section packet using the received PID-SUB value. The TS header regenerator 17500 may restore the remaining TS header, such as the Continuous Counter value and EI, using such information. The sync byte insertion 17600 may restore the Sync byte.

3) In the PID deletion mode, the PID regenerator 17400 may restore the PID using the PID information of the BB-frame acquired by the PID convertor 17300, the TS header regenerator 17500 may restore the remaining TS header, such as the Continuous Counter value and EI, and the sync byte insertion 17600 may restore the Sync byte.

Figure 18:
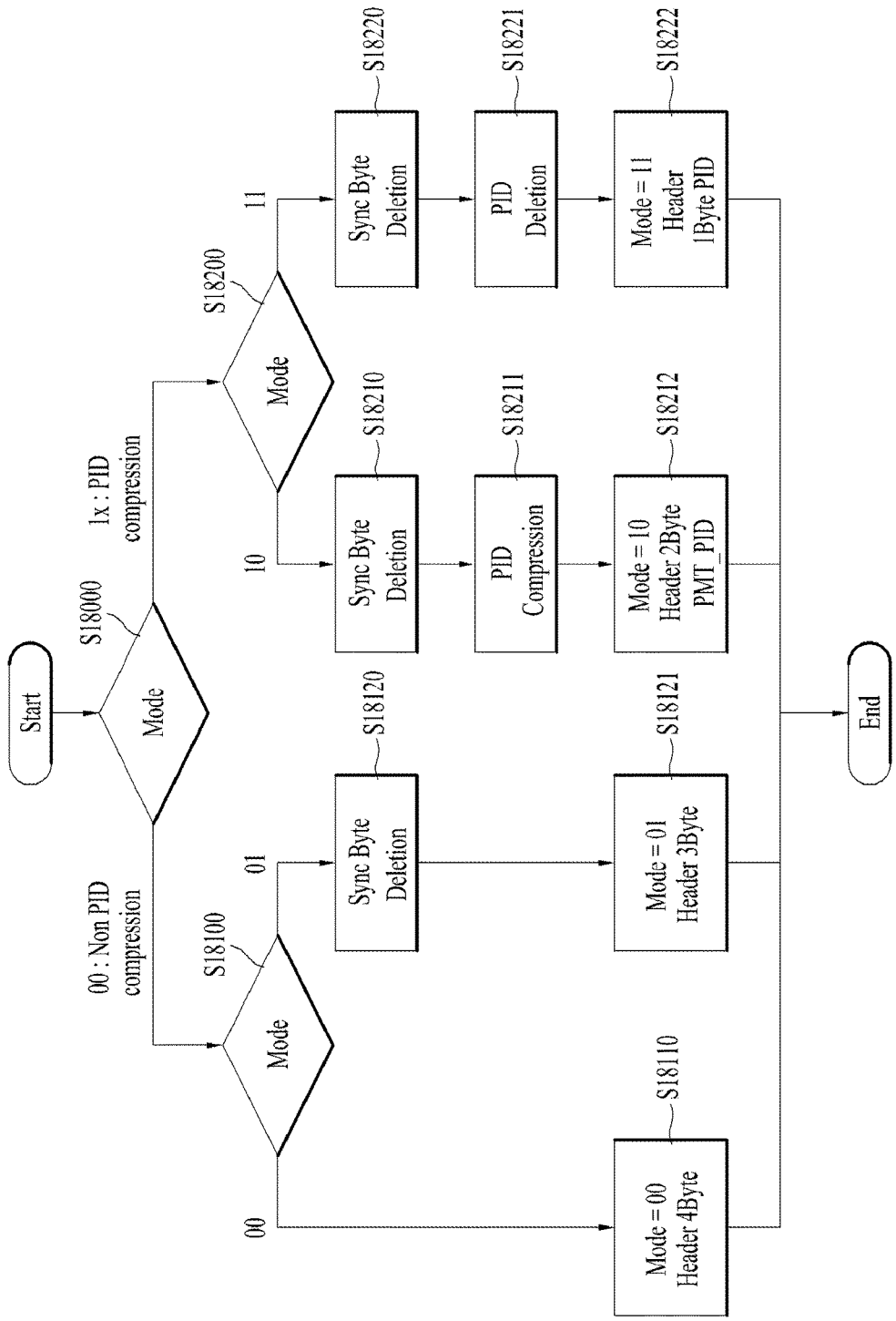
FIG. 18 is a flowchart showing a header compression process according to an embodiment of the present invention.

FIG. 18 is a flowchart showing a header compression process according to an embodiment of the present invention.

As previously described, the header compression mode according to the embodiment of the present invention may include a Sync byte deletion mode to delete only the Sync byte, a PID compression mode to compress the PID for the same service, and a PID deletion mode to delete the PID. The header compression mode according to the embodiment of the present invention may be transmitted through signaling information (mode field) having a size of 2 bits and may indicate each mode according to each bit value.

As shown in FIG. 18, the header compression mode according to the embodiment of the present invention may be divided into a Non-PID compression mode and a PID compression mode (S18000). The Non-PID compression mode may include a header non-compression mode and a Sync byte deletion mode. The PID compression mode may include a PID compression mode to compress the PID and a PID deletion mode to delete the PID.

In addition, the Non-PID compression mode according to the embodiment of the present invention may include a case in which the signaling information having a size of 2 bits is 00 and 01 (S18100). In addition, the PID compression mode according to the embodiment of the present invention may include a case in which the signaling information having a size of 2 bits is 10 and 11 (S18200).

In the Non-PID compression mode and the header non-compression mode, the header compression block according to the embodiment of the present invention does not compress the header. In this case, the mode field has a value of 00 and a header having a size of 4 bytes may be transmitted (S18110).

In the Non-PID compression mode and the Sync byte deletion mode, the header compression block according to the embodiment of the present invention may perform the Sync byte deletion (S18120). In this case, the mode field has a value of 01 and a header having a size of 3 bytes may be transmitted (S18121).

In the PID compression mode and the PID compression mode to compress the PID, the header compression block according to the embodiment of the present invention may perform the Sync byte deletion (S18210) and perform PID compression (S18211). In this case, the mode field has a value of 10 and a header having a size of 2 bytes and PMT_PID may be transmitted (S18212).

In the PID compression mode and the PID deletion mode, the header compression block according to the embodiment of the present invention may perform the Sync byte deletion (S18220) and perform PID deletion (S18221). In this case, the mode field has a value of 11 and a header having a size of 1 bytes and PID may be transmitted (S18222).

Figure 19:
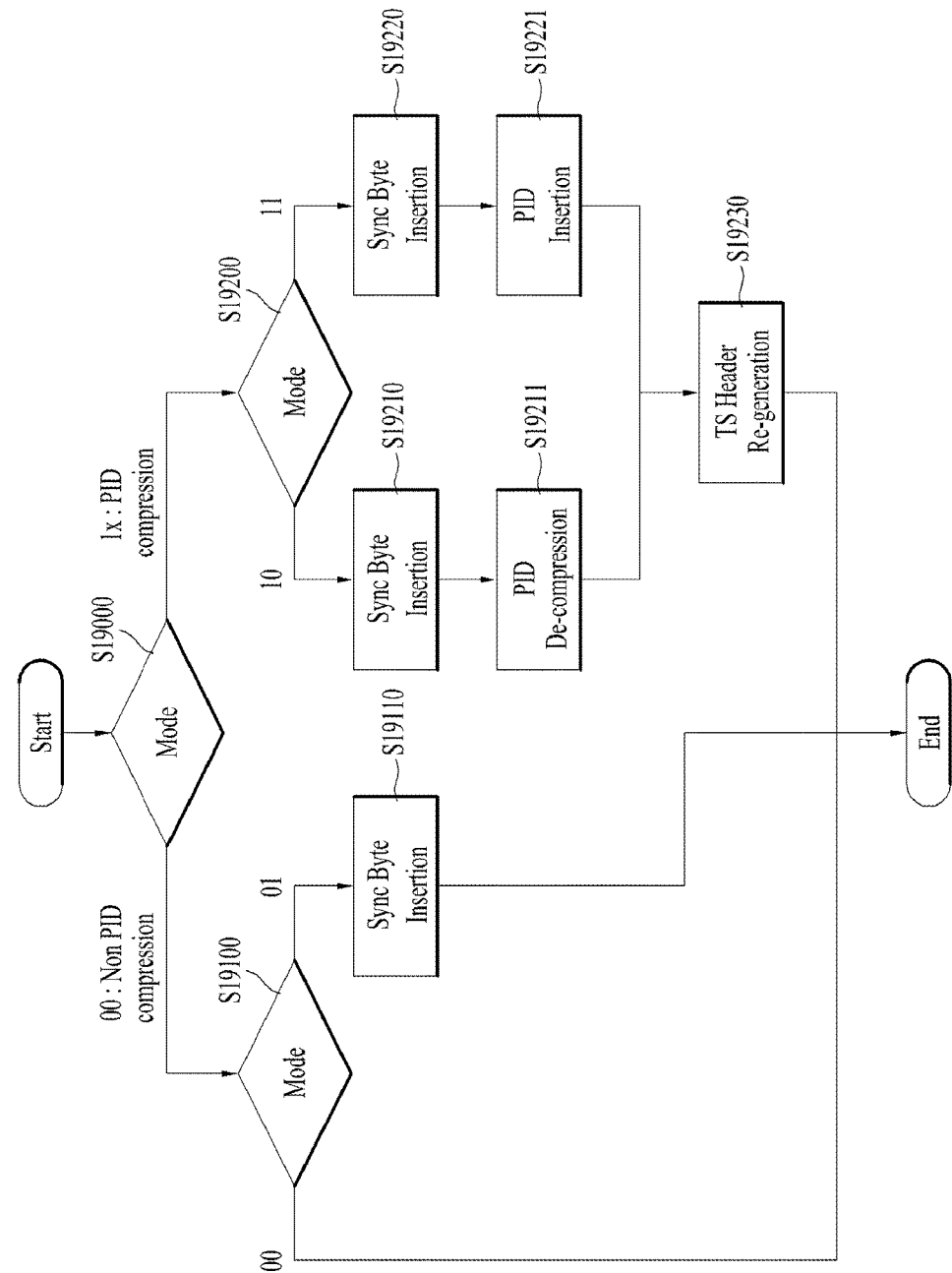
FIG. 19 is a flowchart showing a header de-compression process according to an embodiment of the present invention.

FIG. 19 is a flowchart showing a header de-compression process according to an embodiment of the present invention.

As previously described, the header de-compression process according to the embodiment of the present invention corresponds to the reverse process of the header compression as described above. A broadcast signal receiver according to an embodiment of the present invention may perform header de-compression using information regarding the header compression mode processed by the transmission end. As previously described, the header compression mode according to the embodiment of the present invention may be transmitted through signaling information (mode field) having a size of 2 bits and may indicate each mode according to each bit value. The broadcast signal receiver according to the embodiment of the present invention may perform header de-compression according to the received header de-compression mode information.

As shown in FIG. 19, the header compression mode according to the embodiment of the present invention may be divided into a Non-PID compression mode and a PID compression mode (S19000). The Non-PID compression mode may include a header non-compression mode and a Sync byte deletion mode. The PID compression mode may include a PID compression mode to compress the PID and a PID deletion mode to delete the PID.

In addition, the Non-PID compression mode according to the embodiment of the present invention may include a case in which the signaling information having a size of 2 bits is 00 and 01 (S19100). In addition, the PID compression mode according to the embodiment of the present invention may include a case in which the signaling information having a size of 2 bits is 10 and 11 (S19200).

In the Non-PID compression mode and the header non-compression mode, the header de-compression block according to the embodiment of the present invention does not perform header de-compression.

In the Non-PID compression mode and the Sync byte deletion mode, the header de-compression block according to the embodiment of the present invention may perform the sync byte insertion as the reverse process of the Sync byte deletion processed by the transmission end (S19110).

In the PID compression mode and the PID compression mode to compress the PID, the header de-compression block according to the embodiment of the present invention may perform the sync byte insertion as the reverse process of the Sync byte deletion (S19210) and perform the PID de-compression as the reverse process of the PID compression (S19211). Subsequently, the header de-compression block according to the embodiment of the present invention may perform TS header regeneration (S19230).

In the PID compression mode and the PID deletion mode, the header de-compression block according to the embodiment of the present invention may perform the sync byte insertion as the reverse process of the Sync byte deletion (S19220) and perform the PID insertion as the reverse process of the PID deletion (S19221). Subsequently, the header de-compression block according to the embodiment of the present invention may perform TS header regeneration (S19230).

Figure 20:
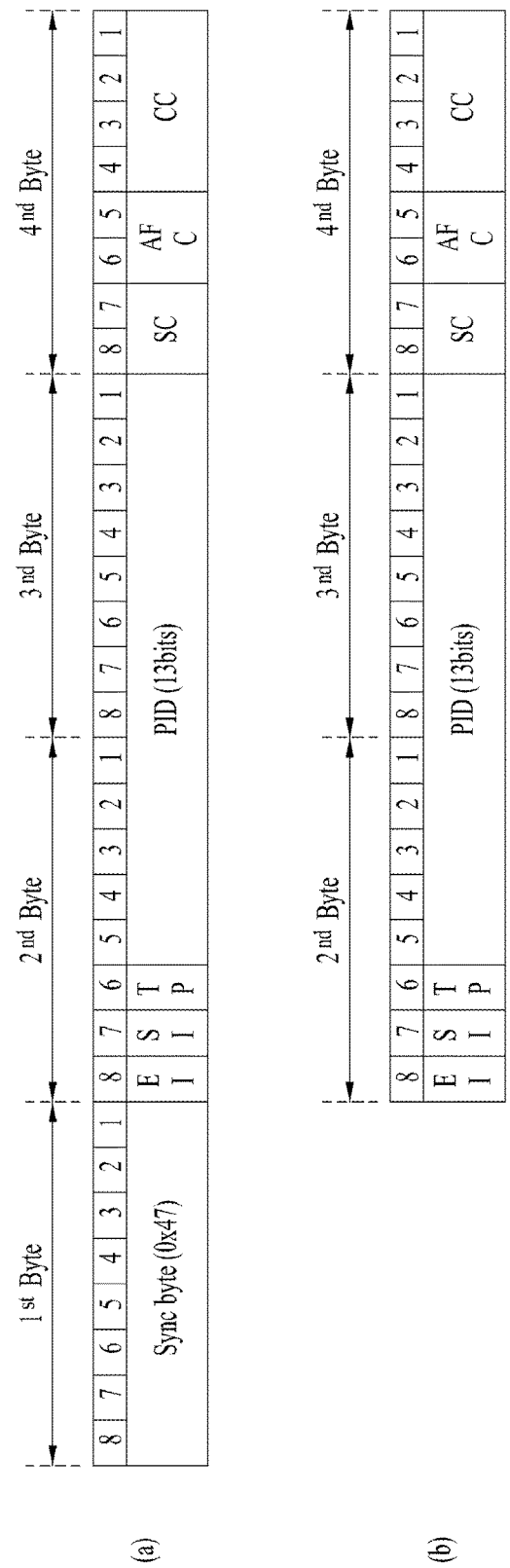
FIG. 20 is a view showing a relationship between a TS header compressed according to a Sync byte deletion mode according to an embodiment of the present invention and an original TS header.

FIG. 20 is a view showing a relationship between a TS header compressed according to a Sync byte deletion mode according to an embodiment of the present invention and an original TS header.

FIG. 20(*a*) shows a raw TS header (original TS header) and FIG. 20(*b*) shows a TS header compressed according to a Sync byte deletion mode according to an embodiment of the present invention.

As shown in FIG. 20(*a*), the original TS header may include a sync byte of a byte, an EI (Transport error indicator) of 1 bit, an SI (Payload unit start indicator) of 1 bit, TP (Transport priority) of 1 bit, PID of 13 bits, SC (Scrambling control) of 2 bits, AFC (Adaptation field control) of 2 bits, and CC (Continuity Counter) of 4 bits.

As shown in FIG. 20(b), the compressed TS header does not include a sync byte. In the Sync byte deletion mode, the Sync byte (0x47) is deleted and not transmitted. The EI bit is replaced with the NI (null packet indicator) bit. The NI bit corresponds to a bit to extend a DNP value, which will hereinafter be described. Therefore, one byte can be deleted from the transmitted signal in this mode. A detailed description thereof will hereinafter be given.

Figure 21:
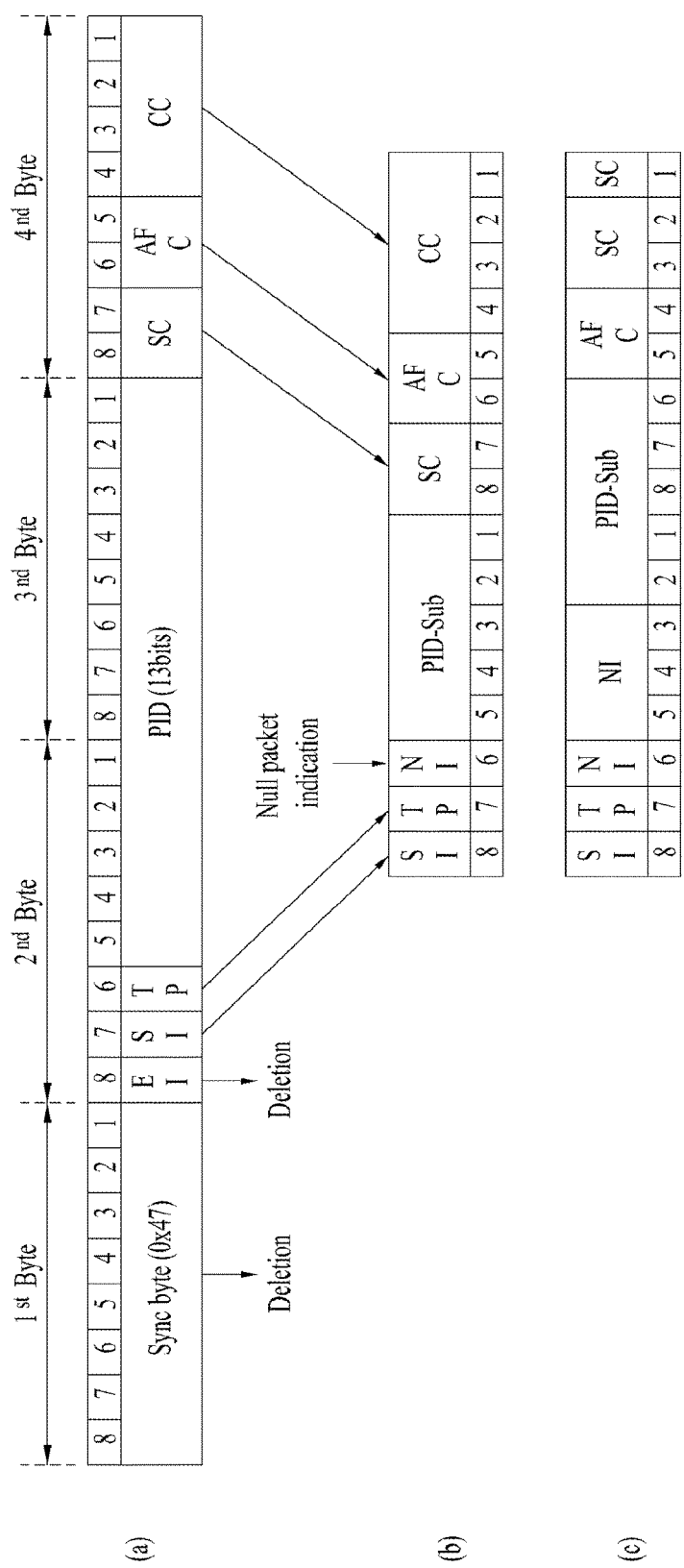
FIG. 21 is a view showing a relationship between a TS header compressed according to a PID compression mode according to an embodiment of the present invention and an original TS header.

FIG. 21 is a view showing a relationship between a TS header compressed according to a PID compression mode according to an embodiment of the present invention and an original TS header.

FIG. 21(a) shows a raw TS header, FIG. 21(b) shows a first embodiment of a TS header compressed according to a PID compression mode according to an embodiment of the present invention, and FIG. 21(c) shows a second embodiment of the TS header compressed according to the PID compression mode according to the embodiment of the present invention.

FIG. 21(a) is identical to FIG. 20(a) and, therefore, a detailed description thereof will be omitted.

As shown in FIGS. 21(b) and 21(c), in the PID compression mode, the header compression block according to the embodiment of the present invention may delete the Sync byte and the EI from the raw TS header. The EI is an indicator indicating whether the TS packet has an error. An environment having no error is premised. Consequently, the header compression block according to the embodiment of the present invention may delete the EI. In this case, a broadcast signal receiving apparatus according to an embodiment of the present invention may perform error checking after decoding and re-input the EI in consideration of presence or absence of an error.

In addition, the broadcast signal receiving apparatus according to the embodiment of the present invention may divide the PID of 13 bits into PID-PMT and PID-SUB and transmit only the PID-SUB through the TS header. Since the PID-SUB has a length of 5 bits, a total of 8 bits of the PID may be compressed. The length of the PID-SUB may be changed according to intention of a designer.

The first embodiment and the second embodiment of the TS header compressed according to the PID compression mode shown in FIGS. 21(b) and 21(c) are different from each other in terms of whether CC is compressed and whether NI is extended. In the first embodiment shown in FIG. 21(b), the NI may have a size of 1 bit and the CC may be transmitted without compression. In this case, the CC may be used in the TS packet recombination or error estimation.

In the second embodiment shown in FIG. 21(c), the NI may have a size of 4 bits and the CC may be transmitted while being compressed to 1 bit. Alternately, a CC sync flag of 1 bit may be transmitted instead of the CC. In addition, positions of the SC and the AFC may be changed. Since the extended NI can be used as an MSB of a DNP, which will hereinafter be described, it is possible to display a larger number of Null packets. In this case, the position of the NI may be changed according to intention of a designer.

FIG. 22 is a table showing a PID-sub according to an embodiment of the present invention.

Specifically, FIG. 22(a) is a table showing a configuration mode of the PID-sub and FIG. 22(b) is a table showing sections in a case in which a PID-sub [4] value is 0.

As shown in FIG. 22(a), the PID-sub [4] value may indicate section information and PID index of the PMT.

Specifically, in a case in which the PID-sub [4] value is 0, it means that a PID-sub [3] value to a PID-sub [0] value indicate PIDs of the Section pocket. In this case, a total number of 16 PIDs may be indicated. In a case in which the PID-sub [4] value is 1, it means a data transmission mode. In a case in which the PID-sub [3] value is 0, it means that the PID-sub [2] value to the PID-sub [0] value indicate PID index values of the PMT. In this case, a total number of 8 PID index values may be indicated. In a case in which the PID-sub [4] value is 1 and the PID-sub [3] value is 1, it means a reserved region to transmit information extended afterwards.

FIG. 22(b) is a table showing detailed table information corresponding to each value in a case in which the PID-sub [4] value is 0.

The field values shown in FIGS. 22(a) and 22(b) or corresponding information may be changed according to intention of a designer.

Figure 23:
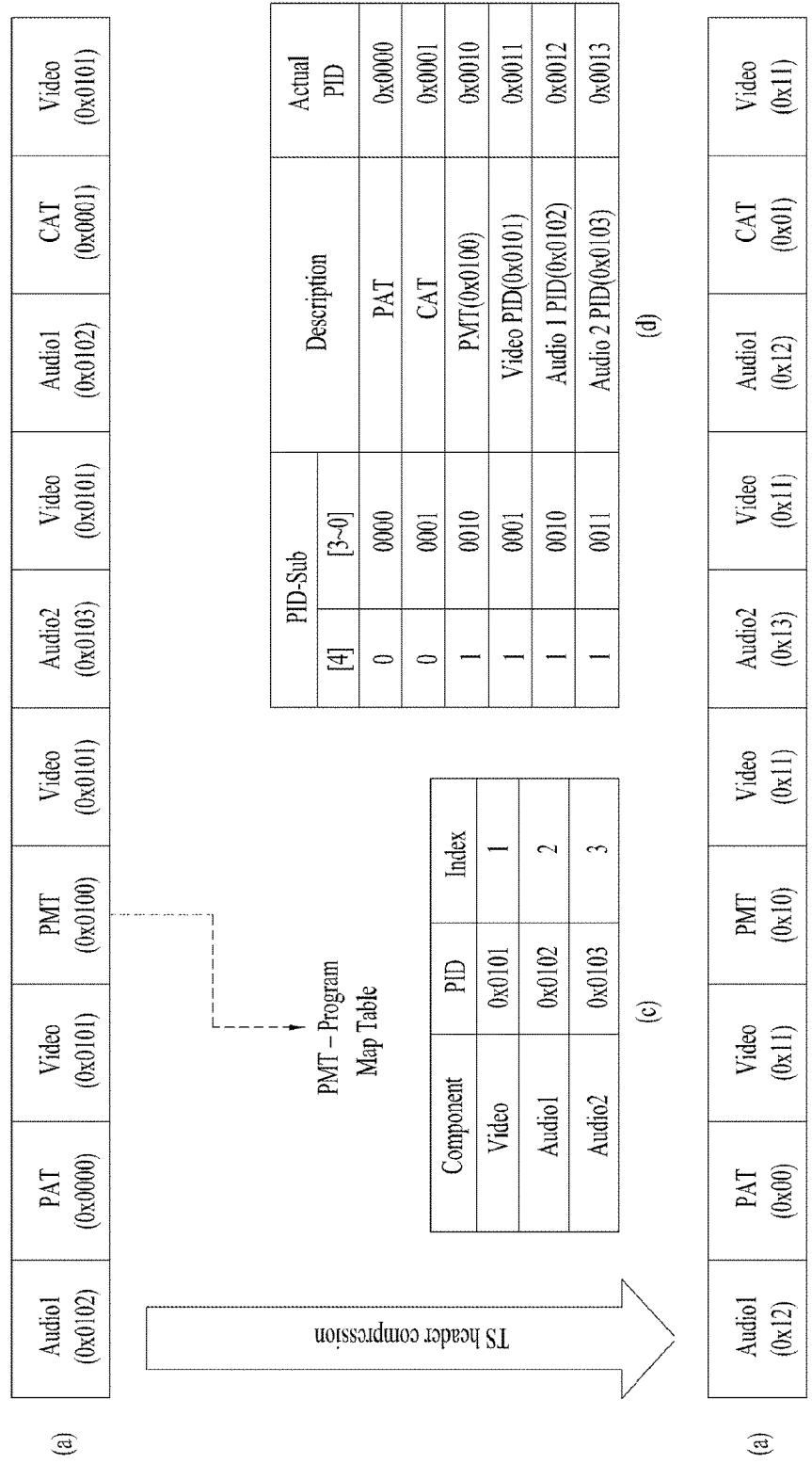
FIG. 23 is a view showing a PID compression process according to an embodiment of the present invention.

FIG. 23 is a view showing a PID compression process according to an embodiment of the present invention.

FIG. 23(a) shows an original TS stream, FIG. 23(b) shows a TS stream after TS compression, FIG. 23(c) is a table showing PIDs and indexes of components included in the original TS stream, and FIG. 23(d) shows a configuration mode of the PID-sub.

As shown in FIG. 23, the TS stream may include one video stream and two audio streams.

The broadcast signal transmitting apparatus according to the embodiment of the present invention may indicate sections, such as a PAT (Program Association Table) and a CAT (Conditional Access Table), using a 5 bit PID-SUB instead of a conventional 13 bit PID.

That is, since it is a case to indicate section information as described with reference to FIG. 22, the PID-sub [4] value becomes 0 and the PAT may be expressed as a value of 0x00 and the CAT may be expressed as a value of 0x01 according to the table of FIG. 23(d). In addition, for the video stream and the audio streams, the broadcast signal transmitting apparatus according to the embodiment of the present invention may transmit the PID information of the PMT through the BB-Frame header and compress elementary PIDs of the remaining components using indexes and then transmit the compressed elementary PIDs to the PID-SUB. That is, in a case indicating the PID of the components, PID-SUB [4:3] may have a value of 10, and the remaining PID-SUB [2:0] may have a value of 001 to 011 based on the PMT table. In addition, the broadcast signal transmitting apparatus according to the embodiment of the present invention may set and compress the PID-SUB [2:0] to 0000.

Figure 24:
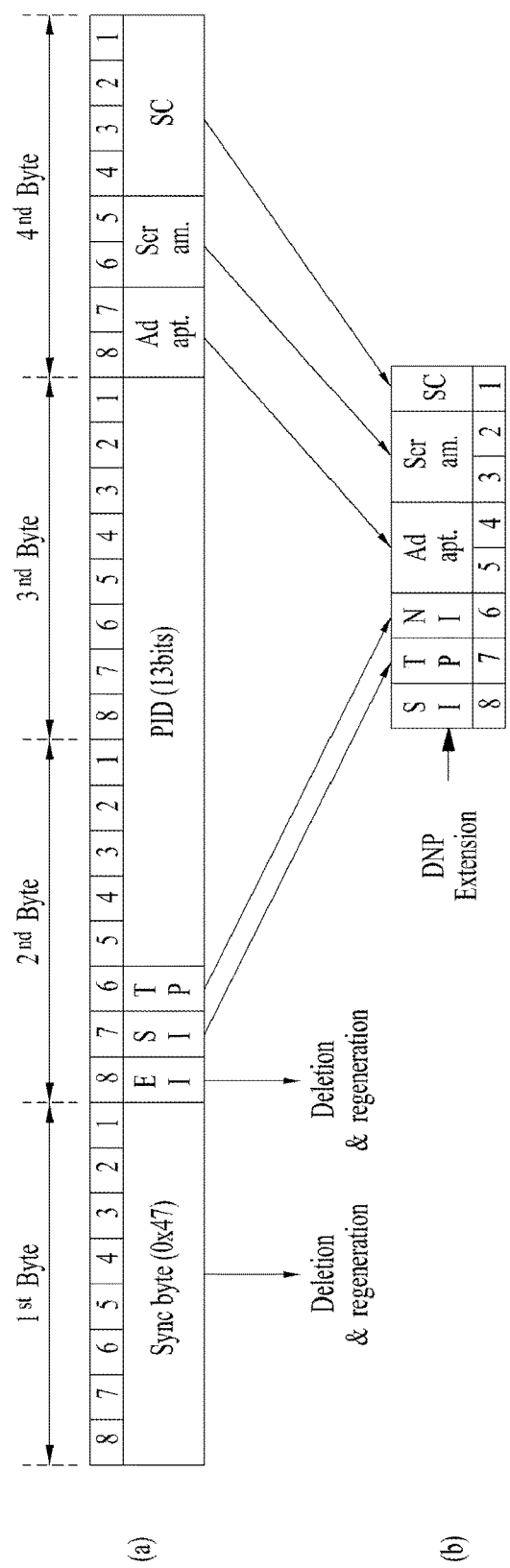
FIG. 24 is a view showing a relationship between a TS header compressed according to a PID deletion mode according to an embodiment of the present invention and an original TS header.

FIG. 24 is a view showing a relationship between a TS header compressed according to a PID deletion mode according to an embodiment of the present invention and an original TS header.

FIG. 24(a) shows a raw TS header and FIG. 24(b) shows a TS header compressed according to a PID deletion mode according to an embodiment of the present invention.

The PID deletion mode should be applied to a single TS packet stream that has only one PID. In the PID deletion mode, the 13-bit PID is removed from the TS packet header. As in the PID compression mode, the Sync byte (0x47) is deleted and the EI bit is replaced with the NI bit at the transmitter. The 4-bit continuity counter is also reduced to 1 bit. The removed 13-bit PID value is delivered in the signal frame.

FIG. 25 is a view showing a PMT according to an embodiment of the present invention.

The PMT according to the embodiment of the present invention may include a table_id, a section_syntax_indicator, a section length field, a program_number field, a version_number field, a current_next_indicator, a section_number, a last_section_number, a PCR_PID, a program_info_length, a first for loop for a descriptor, a second for loop having a stream_type field, an elementary_PID, an ES_info_length field and a CRC 32.

The table_id is an 8-bit unsigned integer field and indicates the type of table.

The section_syntax_indicator indicates the format of the table section to follow.

The section length field is a 12-bit field that gives the length of the table section beyond this field.

The program_number field is a 16-bit unsigned integer that uniquely identifies each program service present in a transport stream.

The version_number field is a 5-bit unsigned integer field and indicates the version number of the table.

The current_next_indicator indicates if data is current in effect or is for future use.

The section_number is an index indicating which table this is in a related sequence of tables.

The last_section_number indicates which table is the last table in the sequence of tables.

The PCR_PID is a packet identifier that contains the program clock reference used to improve the random access accuracy of the stream's timing that is derived from the program timestamp.

The program_info_length field indicates a number of bytes that follow for the program descriptors.

The first for loop for a descriptor denotes the location of a descriptor loop that may contain zero or more individual descriptors.

The stream type field in the second for loop defines the structure of the data contained within the elementary packet identifier.

The elementary_PID in the second for loop is a packet identifier that contains the stream type data.

The ES_info_length field in the second for loop indicates a number of bytes that follow for the elementary stream descriptors.

The CRC 32 is a checksum of the entire table excluding the pointer field, pointer filler bytes and the trailing CRC32.

Figure 26:
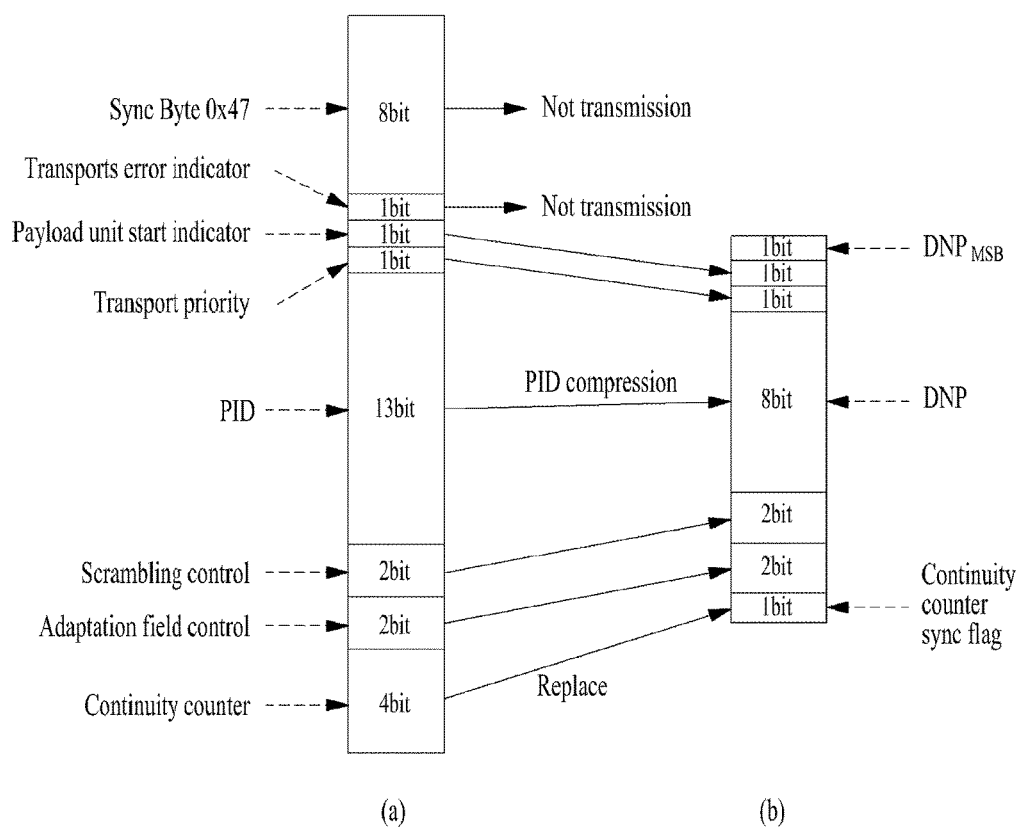
FIG. 26 is a view showing a relationship between a TS header compressed according to a PID compression mode according to another embodiment of the present invention and an original TS header.

FIG. 26 is a view showing a relationship between a TS header compressed according to a PID compression mode according to another embodiment of the present invention and an original TS header.

FIG. 26(a) shows an original TS header and FIG. 26(b) shows a TS header compressed according to a PID compression mode according to another embodiment of the present invention.

The compressed TS header shown in FIG. 26 is different from the compressed TS header shown in FIG. 21 in that $DNP_{MSB}$ bit is input instead of the deleted EI bit and that the 13 bit PID is compressed into an 8 bit sub-PID.

The PID compression mode should be applied when a single DP contains one TS packet stream that has one PMT packet PID value and one or multiple service packet(s) with differing PID(s). In this case, the 13-bit PID value can be compressed to an 8-bit sub-PID. The MSB of the 8-bit sub-PID indicates which type of packet is delivered. The following 7 bits indicate the address for delivering packets. FIG. 26 shows the relationship between the original PID and sub-PID. According to the PID compression mode according to another embodiment of the present invention, the Sync byte (0x47) is deleted and the TS error indicator bit is replaced with the $DNP_{MSB}$ bit. The 4-bit continuity counter can be reduced to 1 bit (continuity counter sync flag), which provides synchronization of the receiver's 4-bit counter.

FIG. 27 is a view showing a table indicating a PID-sub according to another embodiment of the present invention and a mapping table for continuity counter compression.

Specifically, FIG. 27(a) is a table showing a configuration mode of the PID-sub (or sub-PID) and FIG. 27(b) is a mapping table for continuity counter compression.

As shown in FIG. 27(a), in a case in which sub-PID [7] value is 0, the remaining sub-PID [6:0] values may indicate predetermined PIDs. Specifically, specific values of the sub-PID [6:0] may indicate PIDs for the section packets, such as the PAT and the CAT, or null packets. In a case in which sub-PID [7] value is 1, the remaining sub-PID [6:0] values may indicate indexes of PID values of data or components. Actually, the PID values may be transmitted through signaling information, i.e. PLS information, in a signal frame.

FIG. 27(b) is a mapping table for continuity counter compression. Only in a case in which a value of a continuity counter is 0000, a value of a continuity counter sync flag may be set to 1. For the remaining values, a value of the continuity counter sync flag may be set to 0.

The field values shown in FIGS. 27(a) and 27(b) or corresponding information may be changed according to intention of a designer.

Figure 28:
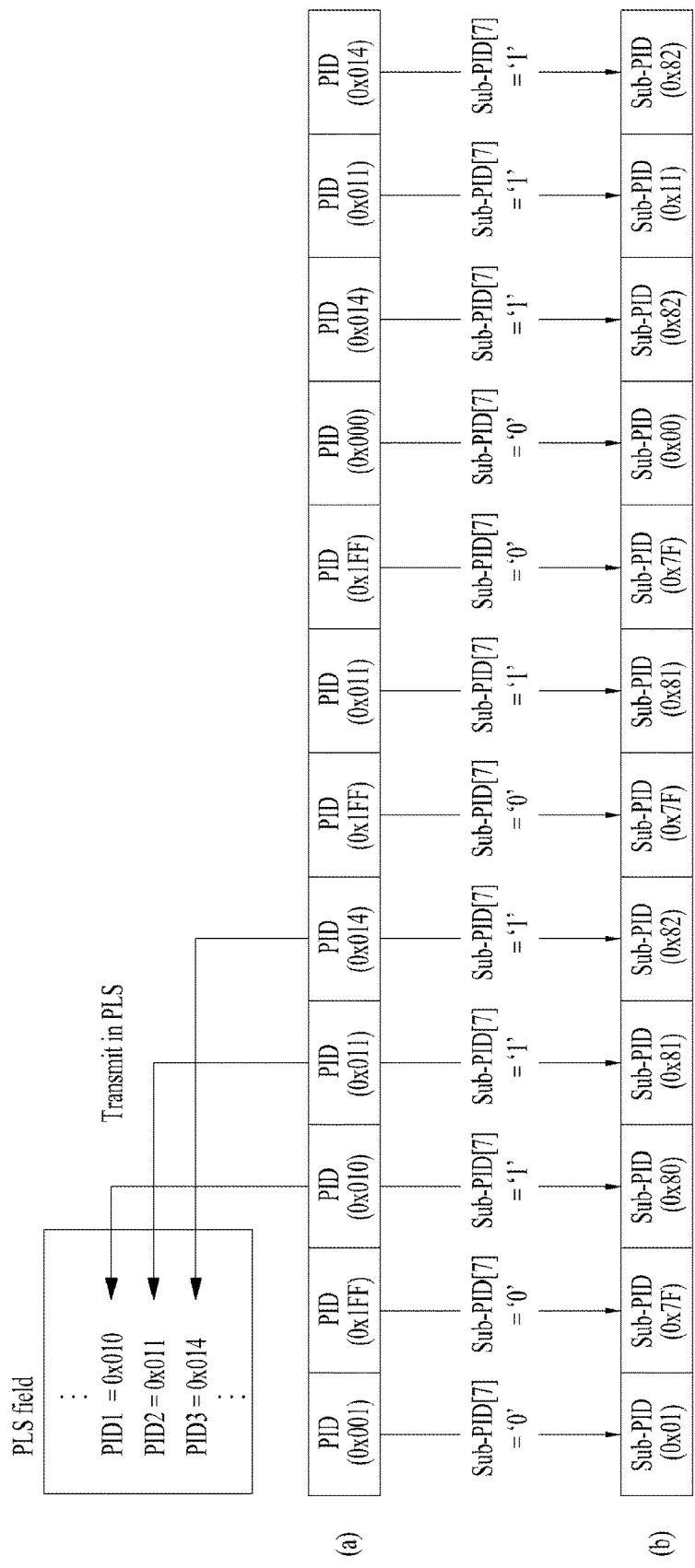
FIG. 28 is a view showing a PID compression process according to another embodiment of the present invention.

FIG. 28 is a view showing a PID compression process according to another embodiment of the present invention.

FIG. 28(a) shows an original TS stream and FIG. 28(b) shows a TS stream after TS compression.

As shown in FIG. 28(a), the original TS packet or TS stream may include various PIDs. In a case in which the included packets are section packets (CAT:0x001, PAT: 0x000, etc.) or Null packets (0x1FF), the sub-PID [7] value may be set to 0 as previously described, the PID of the PAT may be set to 0x00, the PID of the CAT may be set to 0x01, and the PID of the Null packet may be set to 0x1F.

For data or components, the PIDs may be set to 0x010, 0x011, and 0x014. These values may be transmitted through the PLS, the sub-PID [7] value may be set to 1, and the sub-PID [6:0] may transmit only the indexes stored in the PLS.

In response thereto, the broadcast signal receiving apparatus according to the embodiment of the present invention may restore the PIDs using the index values shown in the above table and the real PID values transmitted through the PLS.

When receiving a TS stream as input data, the conventional broadcast signal transmitting apparatus divides the TS stream into service or server component unit packets for efficient transmission. In this process, packets other than the service or server component unit packets may be replaced with null packets. Since the null packets have no information although the null packets are need for CBR (Constant Bit Rate) transmission, the null packets may be deleted during transmission, thereby improving transmission efficiency. In this case, the broadcast signal transmitting apparatus may insert a DNP counter (or DNP) indicating the number of the deleted null packets into a start part of each TS packet to restore the null packets deleted at the receiving end. The DNP counter has a size of 8 bits. The DNP counter may be sequentially increased by 1 according to the number of the deleted null packets to a value of maximum 255. In a future broadcast service according to an embodiment of the present invention, however, a signal having a low data rate may be transmitted, several services may be split into small units, or a large image signal, such as UD, may be split. For this reason, a larger number of continuous null packets than a conventional broadcast service may be present. When DNP reaches the maximum allowed value of the DNP counter, and if the following packet is again a null-packet, then this null-packet is kept as a useful packet and transmitted.

In this case, however, the null packets may be inserted with the result that transmission efficiency of the TS stream may be lowered. In order to solve this problem, the DNP may be extended to 2 bytes. In this method, however, transmission efficiency of the TS stream may also be lowered.

Hereinafter, a DNP extension method to solve the above problem will be described. Specifically, the present invention proposes a method of transmitting DNPE (DNP Extension) while being contained in a compressed TS header as the DNP extension method. A detailed description will hereinafter be given.

In the receiver, removed null packets can be re-inserted in the exact place where they were originally by reference to a DNP counter that is inserted in the transmission, thus guaranteeing constant bit-rate and avoiding the need for time-stamp (PCR) updating.

Figure 29:
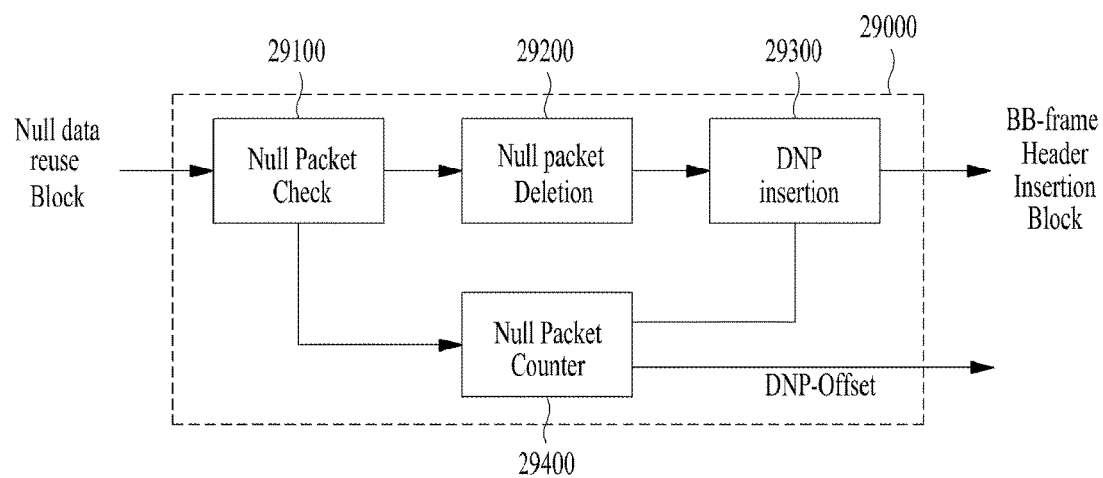
FIG. 29 is a view showing a null packet deletion block according to another embodiment of the present invention.

FIG. 29 is a view showing a null packet deletion block according to another embodiment of the present invention.

The null packet deletion block 29000 shown in FIG. 29 is different from the null packet deletion block 3300 described with reference to FIG. 3.

The Null-packet Deletion block is used only for the TS input stream case. Some TS input streams or split TS streams may have a large number of null-packets present in order to accommodate VBR (variable bit-rate) services in a CBR TS stream.

The null packet deletion block 29000 according to the embodiment of the present invention may include a Null packet check block 29100, a null packet deletion block 29200, a DNP insertion block 29300, and a Null packet counter block 29400. Hereinafter, operations of the respective blocks will be described.

The Null packet check block 29100 may check whether the current packet is a null packet through the PID of the input TS packet.

Upon checking that the current packet is the null packet, the null packet deletion block 29200 may delete the corresponding null packet. In this case, the DNP insertion block 29300 may count the number of the deleted null packet and insert a DNP (deleted null-packet) counter before the TS packet.

Upon checking that the current packet is not the null packet, the null packet deletion block 29200 does not perform any action with respect to the corresponding null packet and the Null packet counter block 29400 may reset the number of the null packets to 0. Subsequently, the DNP insertion block 29300 may insert a DNP before the TS packet using the Null packet counter value calculated by the Null packet counter block 29400. Then, DNP insertion block 29300 may insert NDP in front of the next TS packet by using Null packet counter calculated in In a case in which a DNP offset mode is used, the Null packet counter block 29400 may extract an offset of the DNP value by a BB-Frame section and insert the DNP offset value into a BB-Frame header. In this case, the DNP insertion block 29300 may insert a compressed DNP value before the TS packet. The DNP offset mode will hereinafter be described in detail.

Figure 30:
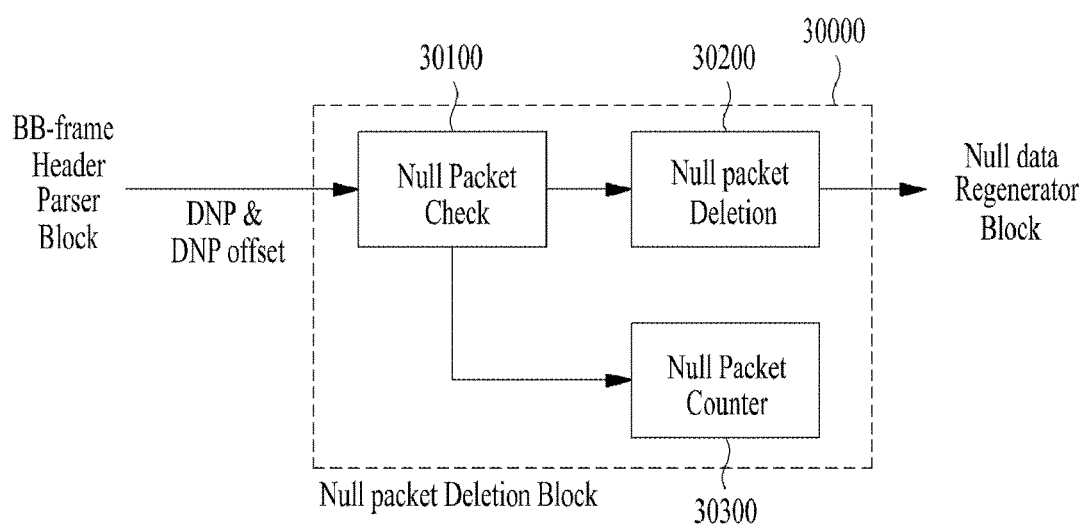
FIG. 30 is a view showing a null packet insertion block according to another embodiment of the present invention.

FIG. 30 is a view showing a null packet insertion block according to another embodiment of the present invention.

The null packet insertion block 30000 shown in FIG. 30 is different from the null packet deletion block 13100 described with reference to FIG. 13.

The null packet insertion block 30000 according to the embodiment of the present invention may include a DNP check block 30100, a null packet insertion block 30200, and a null packet generator block 30300. Hereinafter, operations of the respective blocks will be described.

The DNP check block 30100 may extract a DNP value and a DNP offset value from input data. Subsequently, the null packet insertion block 30200 may receive and insert a Null packet pre-generated by the null packet generator block 30300.

Figure 31:
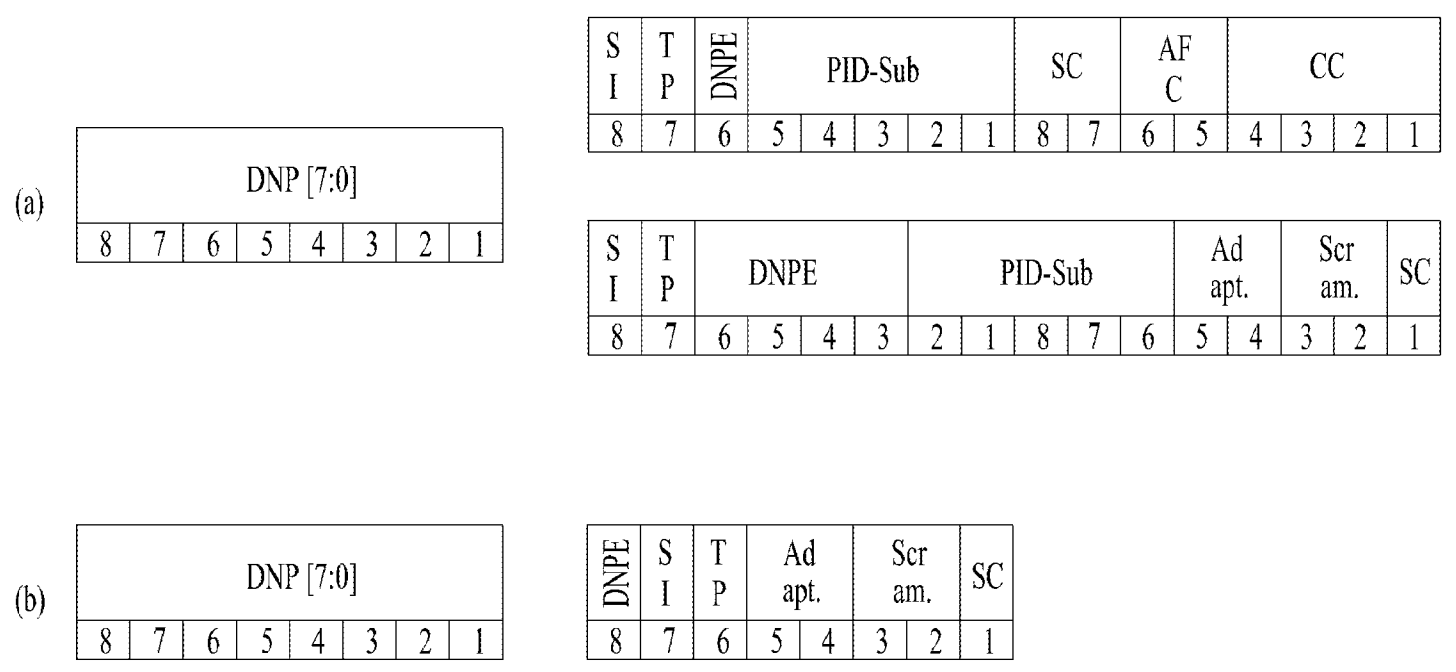

FIG. 31 is a view showing a DNP extension method according to an embodiment of the present invention.

FIG. 31(a) shows a DNP extension method of inserting a 1 bit or 4 bit DNPE into a TS header compressed according to a PID compression mode according to an embodiment of the present invention.

FIG. 31(b) shows a DNP extension method of inserting a 1 bit DNPE into a TS header compressed according to a PID deletion mode according to an embodiment of the present invention.

When Null-packet Deletion is used, after transmission of a data TS packet, a counter is first reset and then incremented at each deleted null-packet. The counter value, designated DNP, indicates the number of deleted null-packets. A DNP according to an embodiment of the present invention may count a maximum of 255 continuous null packets. A DNPE according to an embodiment of the present invention is used to extend the maximum value of the above DNP. The DNPE may be used when the number of the continuous null packets exceeds 255.

The DNP according to an embodiment of the present invention may be inserted in front of the next data TS packet, and the DNPE according to an embodiment of the present invention may be embedded in the compressed TS packet header of the next data TS packet.

For a compressed TS packet header shown at the upper end of FIG. 31(a), a 1 bit DNPE is used and, therefore, the maximum value of the DNP becomes 9 bits, which is obtained by adding 1 bit to the existing 8 bits. Consequently, the DNP counter may indicate a total of 511 deleted null packets. For a compressed TS packet header shown at the lower end of FIG. 31(a), a 4 bit DNPE is used and, therefore, the maximum value of the DNP becomes 12 bits, which is obtained by adding 4 bits to the existing 8 bits. Consequently, the DNP counter may indicate a total of 4095 deleted null packets.

For a compressed TS packet header shown in FIG. 31(b), a PID is deleted and a 1 bit DNPE may be inserted into the first part of the compressed TS packet header. In this case, the maximum value of the DNP becomes 9 bits, which is obtained by adding 1 bit to the existing 8 bits. Consequently, the DNP counter may indicate a total of 511 deleted null packets.

The size and insertion position of the DNPE may be changed according to intention of a designer.

Figure 32:
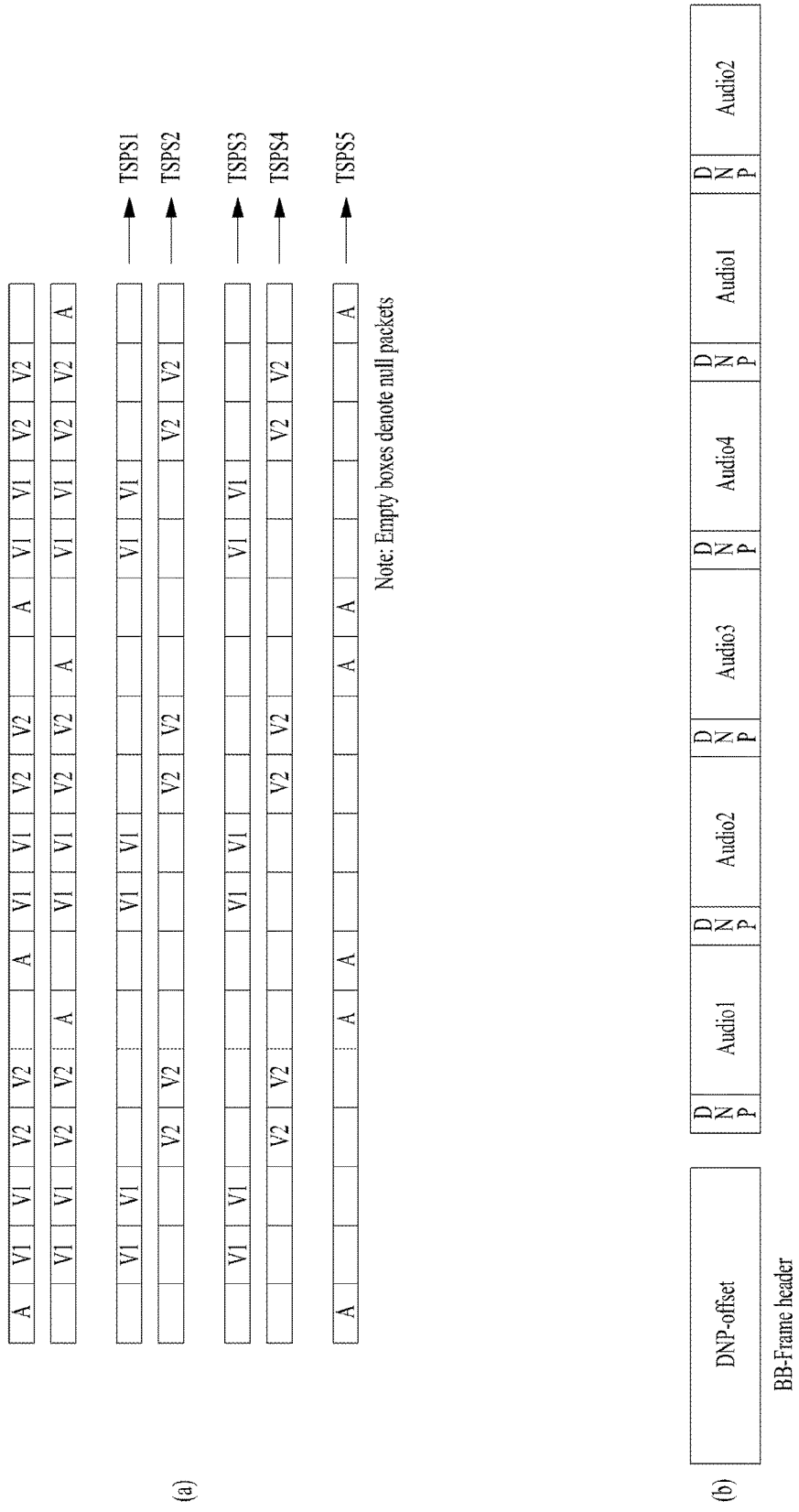
FIG. 32 is a view showing a DNP offset according to an embodiment of the present invention.

FIG. 32 is a view showing a DNP offset according to an embodiment of the present invention.

FIG. 32(a) shows a conventional process of splitting an input TS stream and FIG. 32(b) shows a DNP offset of audio packets.

In a case in which the input TS stream is split as shown in FIG. 32(a), a plurality of null packets may be generated. Particularly, in a case in which a plurality of TS streams is combined as in a Big TS stream, one TS stream is slit into component levels, or big TS is split into a video packet and an audio packet as in a UD service, null packets may be periodically inserted. In this case, the number of basically inserted null packets may be preset although the number of inserted null packets may be changed.

TS input streams or split TS streams having consecutive TS packets and deleted null packets may be mapped into a payload of BB frame as shown in (b). The BB frame includes a BB frame header and the payload. The BB frame header may be inserted in front of the payload.

The present invention proposes a method of transmitting the number of basically inserted null packets, i.e. basic values, using the DNP offset through the BB frame. The DNP-offset according to the embodiment of the present invention is the minimum number of DNPs belonging to the same BBF. The DNP offset can be transmitted through the BB frame header. As a result, it is possible to reduce the number of DNPs inserted before the TS packet, to achieve efficient TS packet transmission, and to remove a larger number of null packets.

The DNP offset of the present invention may be used simultaneously with the above DNP extension. The size, etc. of the DNP offset may be changed according to intention of a designer.

FIG. 33 is a flowchart illustrating a method for transmitting broadcast signals according to an embodiment of the present invention.

The apparatus for transmitting broadcast signals according to an embodiment of the present invention can format at least one input stream to output DP (Data Pipe) data corresponding to each of a plurality of DPs. As described above, a data pipe is a logical channel in the physical layer that carries service data or related metadata, which may carry one or multiple service(s) or service component(s). Data carried on a data pipe can be referred to as DP data. Also, the apparatus for transmitting broadcast signals according to an embodiment of the present invention further splits the at least one input stream into the DP data having data packets and compress a header in the each of the data packets according to a header compression mode. The detail process of step S33000 is as described in FIGS. 16 to 32.

The apparatus for transmitting broadcast signals according to an embodiment of the present invention can encode data pipe (DP) data corresponding to each of a plurality of DPs (S33100). The detailed process of step S30000 is as described in FIG. 1, 5 or 14.

The apparatus for transmitting broadcast signals according to an embodiment of the present invention can map the encoded DP data onto constellations (S33200). In addition, the apparatus for transmitting broadcast signals according to an embodiment of the present invention can perform MIMO processing on the mapped DP data. The detailed process of this step is as described in FIG. 1, 5 or 14.

Then, the apparatus for transmitting broadcast signals according to an embodiment of the present invention can time-interleave the mapped DP data (S33300).

Subsequently, the apparatus for transmitting broadcast signals according to an embodiment of the present invention can build at least on signal frame including the time-interleaved DP data (S33400). The detailed process of this step is as described in FIG. 1 or 6.

The apparatus for transmitting broadcast signals according to an embodiment of the present invention can modulate data included in the built signal frame using an OFDM scheme (S33500). The detailed process of this step is as described in FIG. 1 or 7.

The apparatus for transmitting broadcast signals according to an embodiment of the present invention can transmit broadcast signals including the signal frame (S33600). The detailed process of this step is as described in FIG. 1 or 7.

FIG. 34 is a flowchart illustrating a method for receiving broadcast signals according to an embodiment of the present invention.

The flowchart shown in FIG. 34 corresponds to a reverse process of the broadcast signal transmission method according to an embodiment of the present invention, described with reference to FIG. 33.

The apparatus for receiving broadcast signals according to an embodiment of the present invention can receive broadcast signals (S34000) and demodulate received broadcast signals using an OFDM scheme (S34100). Details are as described in FIG. 8 or 9.

The apparatus for receiving broadcast signals according to an embodiment of the present invention can parse at least one signal frame from the demodulated broadcast signals (S34200). Details are as described in FIG. 8 or 10. In this case, the at least one signal frame can include DP data for carrying services or service components.

Subsequently, the apparatus for receiving broadcast signals according to an embodiment of the present invention can time-deinterleave the DP data included in the parsed signal frame (S34300).

Then, the apparatus for receiving broadcast signals according to an embodiment of the present invention can demap the time-deinterleaved DP data (S34400). Details are as described in FIG. 8 or 11 and FIG. 15.

The apparatus for receiving broadcast signals according to an embodiment of the present invention can decode the demapped DP data (S34500). Details are as described in FIG. 8 or 11 and FIG. 15.

The apparatus for receiving broadcast signals according to an embodiment of the present invention can output process the decoded DP data. More specifically, the apparatus for receiving broadcast signals according to an embodiment of the present invention can decompress a header in the each of the data packets in the decoded DP data according to a header compression mode and recombine the data packets. Details are as described in FIGS. 16 to 32.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for transmitting broadcast signals, the method comprising:
    formatting an input stream to output PLP (Physical Layer Pipe) data including a data packet, wherein the input stream includes at least one null packet and input packets, wherein the formatting further includes:
        deleting the at least one null packet,
        removing a sync byte from each input packet, and
        selectively compressing headers of the input packets,
            wherein the compressing of the headers is performed by transmitting common information of the headers of the input packets once in the data packet that carries payloads of the input packets, and
    wherein a header of the data packet includes first information for identifying whether the compressing of the headers is applied and second information for identifying a number of the deleted at least one null packet;

FEC (Forward Error Correction) encoding the PLP data;
bit interleaving the FEC encoded PLP data;
mapping the bit interleaved PLP data onto constellations;
time interleaving the mapped PLP data;
building at least one signal frame including the time interleaved PLP data;
modulating data in the built at least one signal frame by OFDM (Orthogonal Frequency Division Multiplex) scheme; and
transmitting the broadcast signals having the modulated data.

2. The method of claim 1, wherein the header of the data packet further includes type information for identifying a packet type of the input packets.

3. A method for receiving broadcast signals, the method comprising:
receiving the broadcast signals;
demodulating the received broadcast signals by OFDM (Orthogonal Frequency Division Multiplex) scheme;
parsing at least one signal frame of the demodulated broadcast signals, wherein the at least one signal frame includes PLP (Physical Layer Pipe) data;
time deinterleaving the PLP data;
de-mapping the time deinterleaved PLP data;
bit deinterleaving the de-mapped PLP data;
FEC (Forward Error Correction) decoding the bit deinterleaved PLP data including a data packet that carries payloads of output packets; and
output processing the FEC decoded PLP data to output an output stream including the output packets, wherein the output processing further includes:
parsing the data packet in the FEC decoded PLP data, wherein a header of the data packet includes first information for identifying whether headers of the output packets are compressed and second information for identifying a number of at least one null packet to be regenerated,
selectively restoring the headers of the output packets based on the first information, wherein the restoring of the headers is performed based on common information of the headers of the output packets received once in the data packet,
inserting a sync byte into each output packet, and
regenerating the at least one null packet in the output stream based on the second information.

4. The method of claim 3, wherein the header of the data packet further includes type information for identifying a packet type of the output packets.

5. An apparatus for transmitting broadcast signals, the apparatus comprising:
an input formatter that formats an input stream to output PLP (Physical Layer Pipe) data including a data packet, wherein the input stream includes at least one null packet and input packets, wherein the input formatter further includes:
deleting the at least one null packet,
removing a sync byte from each input packet, and
selectively compressing headers of the input packets, wherein the compressing of the headers is performed by transmitting common information of the headers of the input packets once in the data packet that carries payloads of the input packets, and
wherein a header of the data packet includes first information for identifying whether the compressing of the headers is applied and second information for identifying a number of the deleted at least one null packet;
a FEC (Forward Error Correction) encoder that FEC encodes the PLP data;
a bit interleaver that bit interleaves the FEC encoded PLP data;
a mapper that maps the bit-interleaved PLP data onto constellations;
a time interleaver that time interleaves the mapped PLP data;
a frame builder that builds at least one signal frame including the time interleaved PLP data;
a modulator that modulates data in the built at least one signal frame by OFDM (Orthogonal Frequency Division Multiplex) scheme; and
a transmitter that transmits the broadcast signals having the modulated data.

6. The apparatus of claim 5, wherein the header of the data packet further includes type information for identifying a packet type of the input packets.

7. An apparatus for receiving broadcast signals, the apparatus comprising:
a receiver that receives the broadcast signals;
a demodulator that demodulates the received broadcast signals by OFDM (Orthogonal Frequency Division Multiplex) scheme;
a frame parser that parses at least one signal frame of the demodulated broadcast signals, wherein the at least one signal frame includes PLP (Physical Layer Pipe) data;
a time deinterleaver that time deinterleaves the PLP data;
a de-mapper that demaps the time deinterleaved PLP data;
a bit deinterleaver that bit deinterleaves the de-mapped PLP data;
a FEC (Forward Error Correction) decoder that FEC decodes the bit-deinterleaved PLP data including a data packet that carries payloads of output packets; and
an output processor that output processes the FEC decoded PLP data to output an output stream including the output packets, wherein the output processor further includes:
parsing the data packet in the FEC decoded PLP data, wherein a header of the data packet includes first information for identifying whether headers of the output packets are compressed and second information for identifying a number of at least one null packet to be regenerated,
selectively restoring the headers of the output packets based on the first information, wherein the restoring of the headers is performed based on common information of the headers of the output packets received once in the data packet,
inserting a sync byte into each output packet, and
regenerating the at least one null packets in the output stream based on the second information.

8. The apparatus of claim 7, wherein the header of the data packet further includes type information for identifying a packet type of the output packets.

* * * * *